United States Patent [19]
Furukawa

[11] Patent Number: 5,487,070
[45] Date of Patent: Jan. 23, 1996

[54] APPARATUS FOR REPRODUCING RECEIVED DATA

[75] Inventor: Yukio Furukawa, Kawasaki, Japan

[73] Assignee: Fujitsu Limited, Kawasaki, Japan

[21] Appl. No.: 84,021

[22] Filed: Jun. 30, 1993

[30] Foreign Application Priority Data

Jul. 2, 1992 [JP] Japan .................................. 4-175464

[51] Int. Cl.[6] ...................................................... H04J 3/06
[52] U.S. Cl. ............................ 370/108; 370/103; 375/359
[58] Field of Search ................................ 370/108, 105.4, 370/104.1, 103, 10.1, 95.3, 85.1, 32.1, 112; 375/95, 110, 118, 119, 342, 359, 371, 373

[56] References Cited

U.S. PATENT DOCUMENTS

| | | | |
|---|---|---|---|
| 3,962,646 | 6/1976 | Tempka | 370/13 |
| 4,337,463 | 6/1982 | Vangen | 375/110 |
| 4,677,614 | 6/1987 | Circo | 370/103 |
| 4,677,618 | 6/1987 | Haas et al. | 370/108 |
| 4,805,195 | 2/1989 | Keegan | 370/108 |
| 4,812,839 | 3/1989 | Okada et al. | 370/103 |
| 5,103,465 | 4/1992 | Crisler et al. | 375/110 |
| 5,229,998 | 7/1993 | Weisser | 370/108 |
| 5,280,629 | 1/1994 | Lo Galbo et al. | 375/110 |

*Primary Examiner*—Douglas W. Olms
*Assistant Examiner*—Shick Hom
*Attorney, Agent, or Firm*—Staas & Halsey

[57] ABSTRACT

An apparatus for receiving at a master station signals from a plurality of slave stations connected by a bus and then reproducing the data, wherein use is made of a single clock generating source of a fixed phase so as to simplify the apparatus, provision being made of a data/clock relative delay unit which gives a variable relative delay between the fixed phase clock and the received data signal received by the master station in accordance with the phase difference between a transmitted frame timing pulse (TF) from the master station and the received frame timing pulse (RF) received from the slave stations.

11 Claims, 19 Drawing Sheets

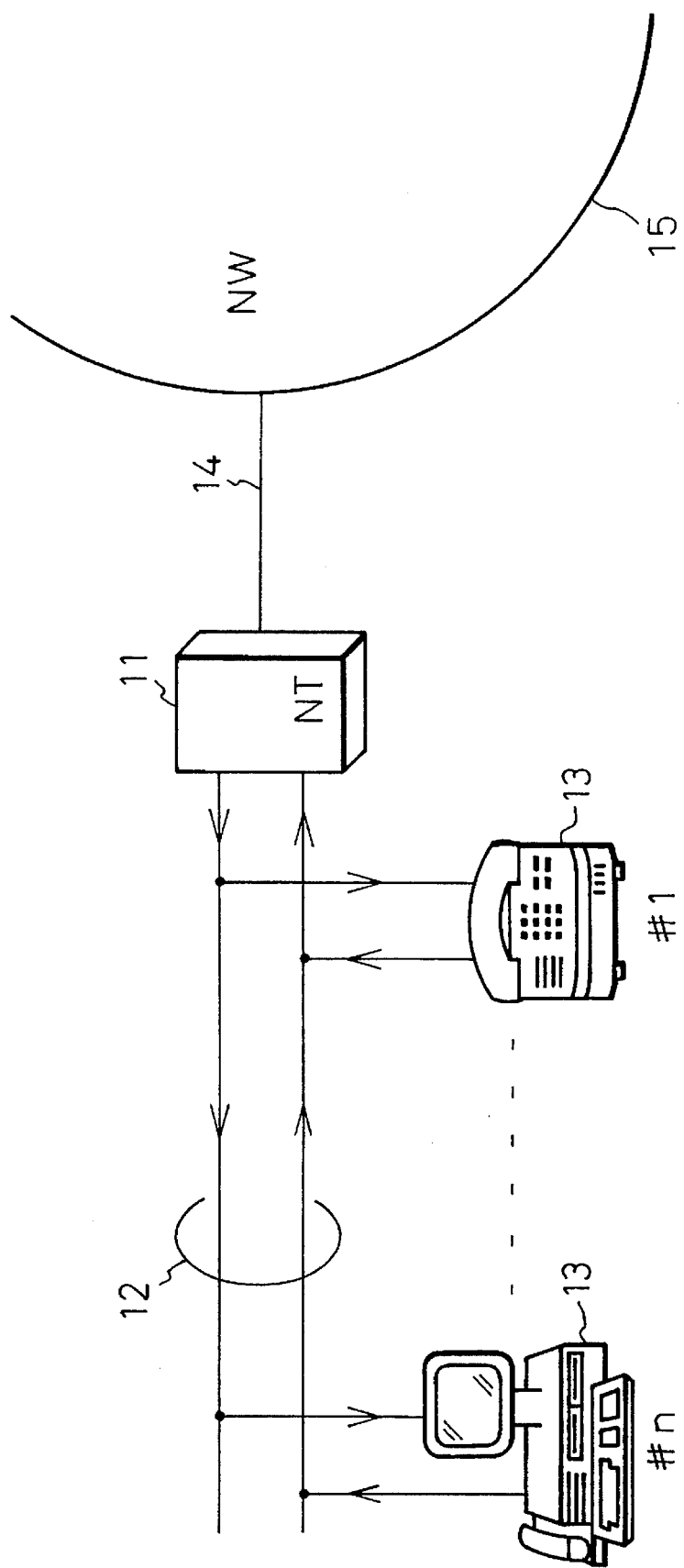

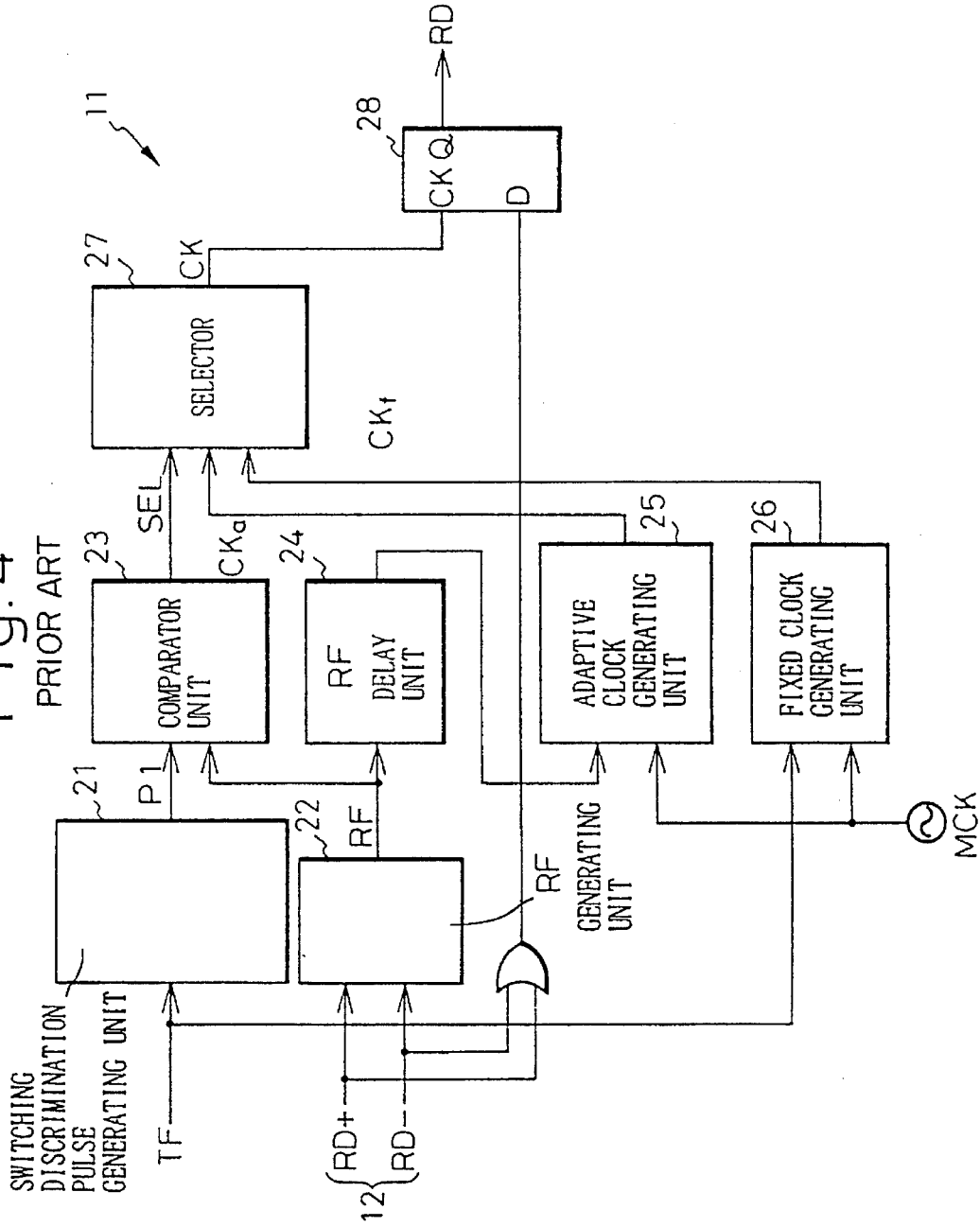

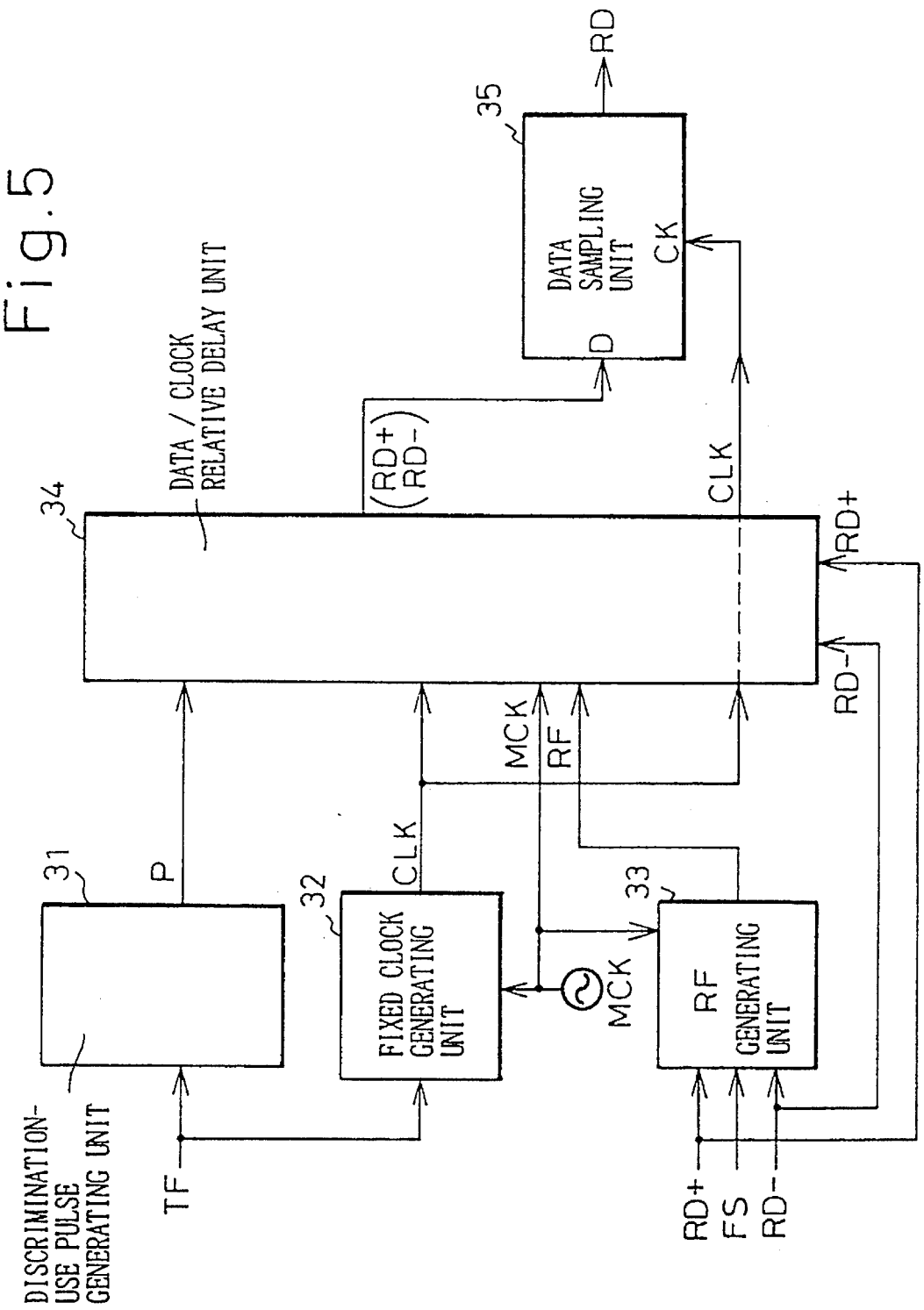

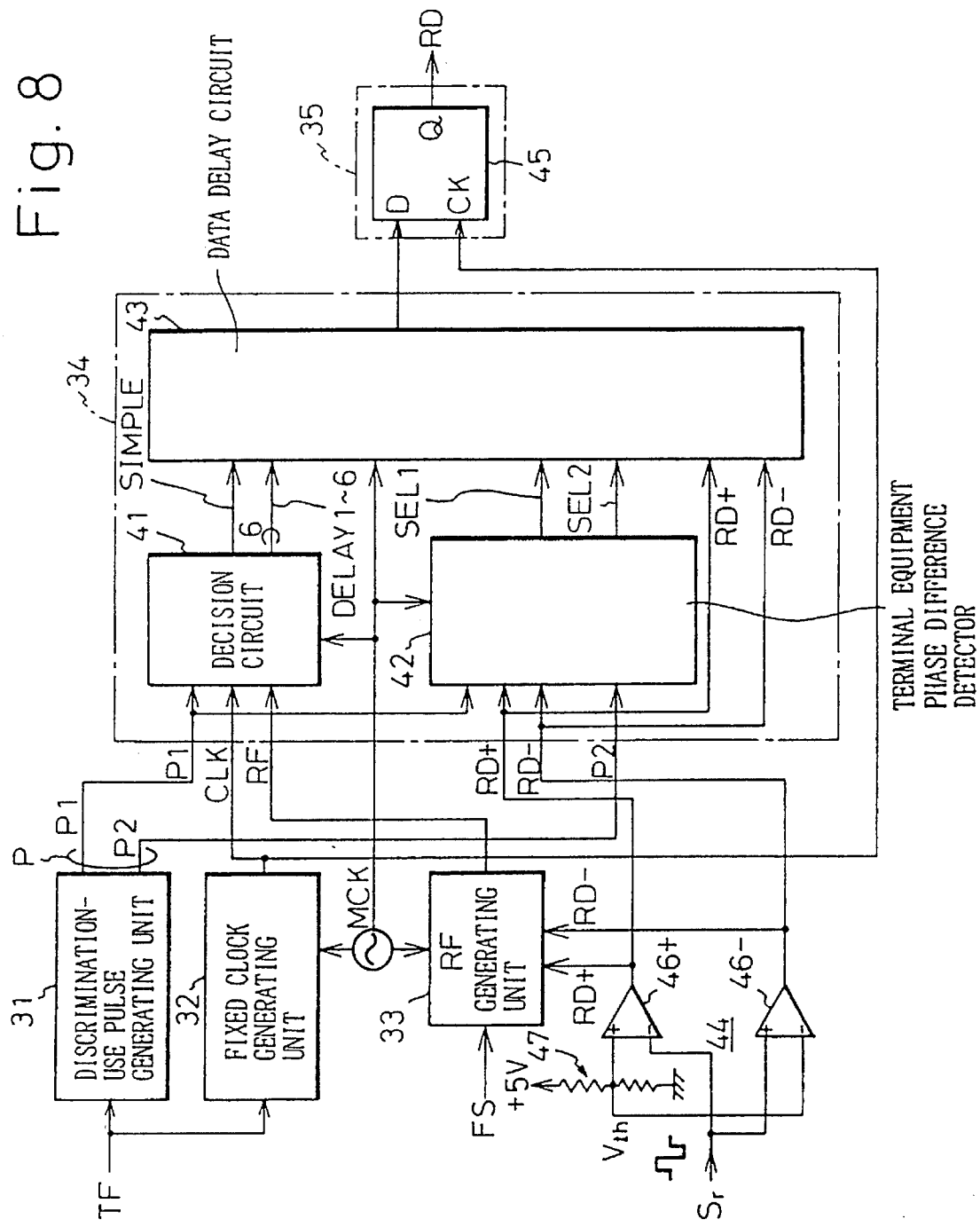

APPARATUS FOR REPRODUCING RECEIVED DATA

BACKGROUND OF THE INVENTION

1. Field of the Invention

The present invention relates to an apparatus for reproducing received data, for example, an apparatus for reproducing received data in a network termination apparatus.

In an integrated service digital network (ISDN) which provides audio, visual, data, and other forms of information communication services integrated using digital signals, the user-network interface between the users in the ISDN and the network is specified by the International Telegraph and Telephone Consultative Committee (CCITT) in its I-series recommendations. This is usually known therefore as an "I-interface".

The characteristic feature of an I-interface is the use of a so-called "bus connection" for the connection between the network termination apparatus of the master station, that is, the apparatus for terminating the subscriber lines connected to the network, and the plurality of units of subscriber terminal equipment forming the plurality of slave stations, that is, the group of terminal equipment connected to the subscriber lines.

Since such a bus connection is used, in upstream communication from the subscriber terminal equipment (slave stations) to the network termination apparatus (master station), the network termination apparatus (master station) receives signals having a variety of pulse phases and signals having a variety of amplitudes at its input end. The reason is that the distance between each of the plurality of units of subscriber terminal equipment (slave stations) connected in a multidrop mode with respect to the bus and the network termination apparatus (master station) differs with each subscriber line (each slave station).

Therefore, a particular technique for reproduction of the received data is required for the network termination apparatus (master station) to receive the signals sent from the different units of subscriber terminal equipment (slave stations) and reproduce them as received data. The present invention relates to this technology for reproduction of received data.

2. Description of the Related Art

As will be explained in detail later with reference to the drawings, optimal reproduction of received data can be realized by providing in the network termination apparatus a plurality of types of timing clocks having different phases corresponding to the variety of units of subscriber terminal equipment and to suitably switch among these timing clocks.

If this is done, however, it becomes difficult to select from among the variety of timing clocks without error. Therefore, an automatic decision/switching circuit which automatically performs a series of operations for deciding on the optimum timing clock among the plurality of clocks and switching to that optimal timing clock becomes necessary. An apparatus for reproducing received data actually incorporating such an automatic decision/switching circuit, however, becomes complicated, large in size, and high in cost, so is not practical.

In view of this situation, design has been made of an apparatus for reproducing received data (FIG. 4), explained in detail later, which enables switching between two types of clocks—an adaptive clock ($CK_a$) and a fixed clock ($CK_f$).

This conventional apparatus for reproducing received data, however, requires means for generating the adaptive clock ($CK_a$) and the fixed clock ($CK_f$) and a decision and switching means for selecting among these clocks, so also suffers from the problem of a more complicated construction.

SUMMARY OF THE INVENTION

Therefore, the object of the present invention is to provide an apparatus for reproducing received data having a simpler construction.

To attain the above object, the apparatus is simplified by using a single fixed phase type clock generating source. Toward this end, provision is made of a data/clock relative delay unit, which gives a variable relative delay between a fixed phase clock and the received data signal received at the network termination apparatus (master station) in accordance with the phase difference between a transmission frame timing pulse (TF) from the network termination apparatus (master station) and a reception frame timing pulse (RF) received from the subscriber terminals (slave stations).

BRIEF DESCRIPTION OF THE DRAWINGS

The above object and features of the present invention will be more apparent from the following description of the preferred embodiments with reference to the accompanying drawings, wherein:

FIG. 1 is a constitutional view of a general system showing the network termination apparatus and its peripheral devices to which the present invention is applied;

FIG. 4 is a block diagram showing a conventional apparatus for reproducing received data;

FIG. 5 is a block diagram showing the basic constitution of the present invention;

FIG. 8 is a view showing an embodiment of the present invention;

DESCRIPTION OF THE PREFERRED EMBODIMENTS

Figure 2A:
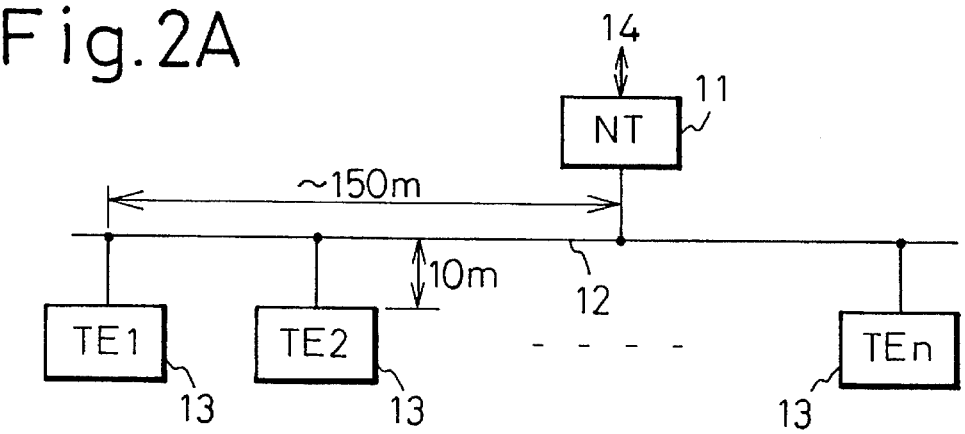
FIGS. 2A to 2C are views of three types of connection modes in an I-interface.

Before describing the embodiments of the present invention, the related art and the problems therein will be first described with reference to the related figures.

FIG. 1 is a constitutional view of a general system showing the network termination apparatus and its peripheral devices to which the present invention is applied. In the figure, reference numeral 11 is a network termination apparatus which is placed at a position called the S/T point.

The network termination apparatus 11, as illustrated, terminates the subscriber lines 14 connected to the network 15 and on the other hand connects the plurality of units of subscriber terminal equipment (TE) 13#1 . . . 13#n through the bus 12 in the so-called "bus connection" format. Note that a maximum of eight (n=8) units of the subscriber terminal equipment 13 can be connected to the bus 12, but since the bus is formed with a so-called "2B–D channel" construction, two of those (one using the B1 channel and the other using the B2 channel) can simultaneously communicate with the network 15 side. The D-channel is a so-called "control channel".

Figure 2B:
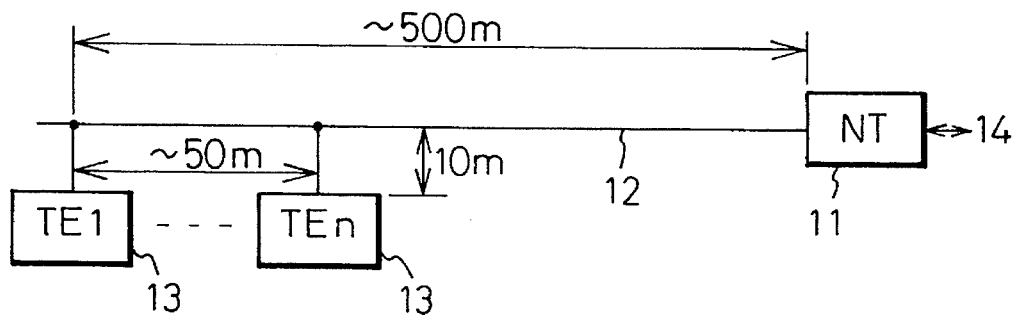
Figure 2C:
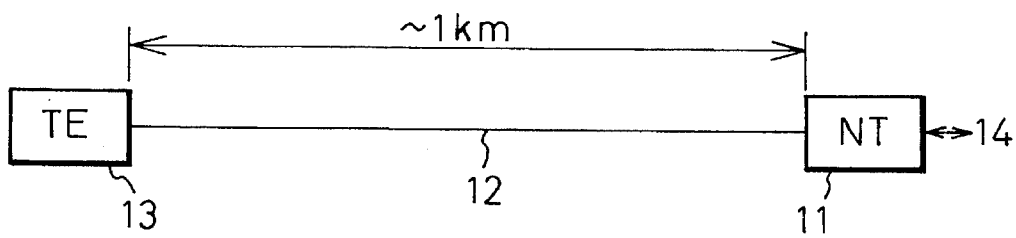

FIGS. 2A to 2C are views of three modes of connection in an I-interface. FIG. 2A shows what is called a "simple bus" mode, FIG. 2B an "extended bus" mode, and FIG. 2C a "point-to-point" mode.

In the case of the simple bus mode (FIG. 2A), a plurality of units of terminal equipment 13 can be connected anywhere so long as the distance from the network termination apparatus (NT) 11 to the farthest unit of terminal equipment 13 is less than 150 meters and the distance from the bus 12 is less than 10 meters.

In the case of the extended bus mode (FIG. 2B), there are the limitations on distance as shown in the figure. There is the further limitation that the distance between the farthest unit of terminal equipment (TEl) 13 and the nearest unit of terminal equipment (TEn) 13 be within 50 meters.

In the case of the point-to-point mode (FIG. 2C), a unit of subscriber terminal equipment (TE) and the network termination apparatus (NT) 11 are connected in a one-to-one format.

The specifications of the CCITT I-series recommendations relating to the above I-series are given below by way of reference.

TABLE 1

| Item | Specifications |
| --- | --- |
| Capacity | B1 + B2 + D (144 kb/s)<br>B: information (audio, data, etc.); 64 kb/s<br>D: subscriber line signal, low speed data; 16 kb/s |

TABLE 1-continued

| Item | Specifications |
| --- | --- |
| Transmission rate | 192 kb/s |
| Transmission code | When "1", ground level (G)<br>When "0", alternation between + level and − level<br>Ex.; 1100110001011 |
| Connection mode | (1) Simple bus: up to 150 meters<br>(2) Extended bus: up to 500 meters<br>(3) Point-to-point: up to 1 km |
| No. of units of terminal equipment | Maximum eight units |
| D-channel conflict control method | Echo-D channel straight victory |
| Link layer protocol | LAP-D |

(CCITT recommendation I.430)

Among the items of the above table, the capacity, connection mode, and number of units of terminal equipment are as explained above.

The reason why the transmission rate is 192 kb/s despite the information rate being 144 kb/s is that, as explained later, additional bits such as the frame bit (F), the DC balancing bit (L), and the auxiliary frame bit ($F_a$) are further included.

The transmission code, as shown in the table, is based on the so-called "alternative mark inversion" (AMI) coding rule.

The echo-D-channel conflict control method provides the protocol for deciding to which unit of subscriber terminal equipment (TE) 13 to allow communication when there are simultaneous requests for communication from three or more units of subscriber terminal equipment, since communication is allowed only for up to two. This is performed using the later mentioned E-bits. This has no relation with the gist of the present invention, however. The link layer protocol, on the other hand, shows the communication protocol at the layer 2 between the network termination apparatus 11 and the units of terminal equipment 13.

Figure 3:
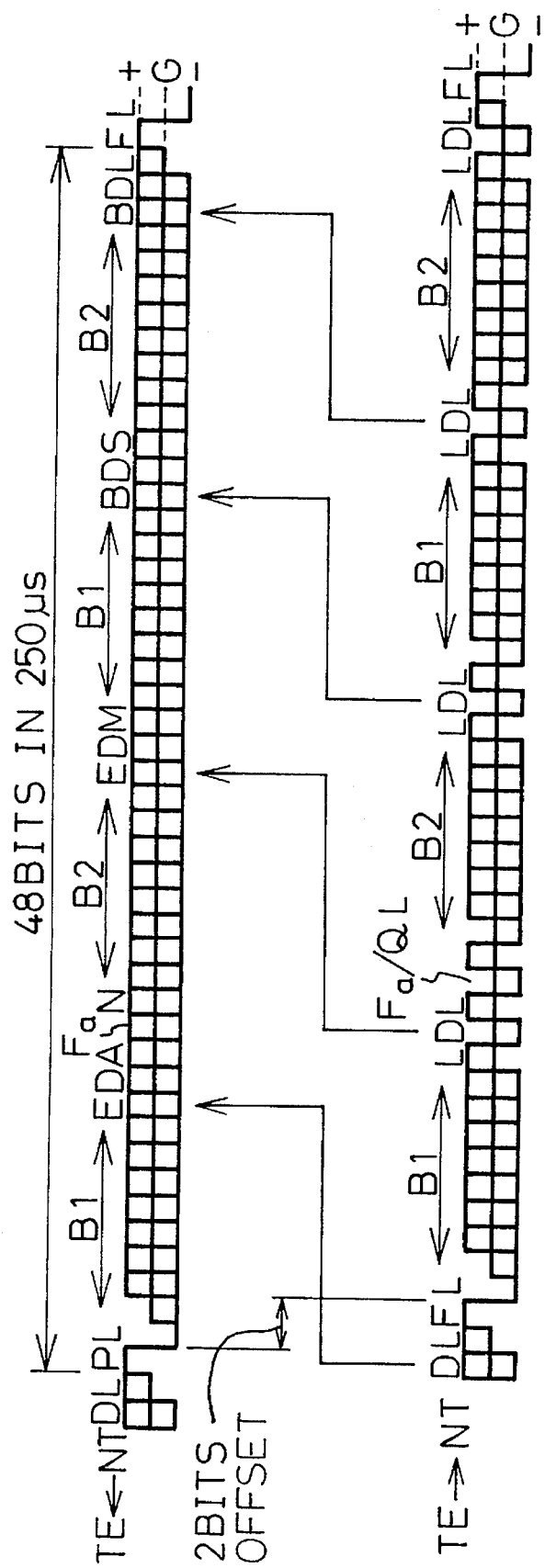
FIG. 3 is a view showing the frame format on the bus in the I-interface.

FIG. 3 is a view showing the frame format on the bus in the I-interface. The top section shows the frame format of the downstream signals from the network termination apparatus 11 to the units of terminal equipment 13, while the bottom section shows the frame format of the upstream signals from the units of terminal equipment 13 to the network termination apparatus 11. Note that the bits are defined as having the following meanings:

F=Framing bit

L=DC balancing bit

D=D-channel bit

E=D-echo-channel bit $F_a$=Auxiliary framing bit

N=Bit set to a binary value (N=$F_a^-$, $F_a^-$ indicating polarity inversion of $F_a$)

B1=Bit within B channel 1 (first information)

B2=Bit within B channel 2 (second information)

A=Bit used for activation

S=Reserved for future standardization

M=Multiframing bit

Q=Q-channel bit

Among the above group of bits, those having particular relevance to the explanation of the present invention are the F (framing bit), L (DC balancing bit), $F_a$ (auxiliary framing bit), and B1 and B2 bits.

The framing bit F is the bit used for frame synchronization and indicates the head of a frame (48 bits in 250 μs→192 kb/s), the DC balancing bit L is the bit for maintaining the average voltage of the bus 12 constantly at the ground level (G), and the auxiliary framing bit $F_a$ is the bit used for auxiliary purposes in the above frame synchronization. As is well known, in general, frame synchronization is performed by cyclic bipolar violation on the frame bit F (locally breaking the alternation of positive and negative polarity and creating a consecutive pulse of the same polarity), but it is the bit $F_a$ which functions to reliably create the bipolar violation. Note at in the lower section of FIG. 3, $F_a$/Q shows that use is made of the bit Q instead of the bit $F_a$ once for every five multiframes. The bit Q may for example be used for transferring maintenance information.

The network termination apparatus (NT) 11 receives transmitted signals from the units of the subscriber terminal equipment (TE) 13 through the bus 12 by the frame format shown in the lower section of FIG. 3 and reproduces the received data from the received signals. To reproduce the received data at a high efficiency, first it is necessary that the timing of the clocks for hitting the bits of the received signals accurately coincides with the timing of the bits. The bit data is sampled by the clocks at a position where the so-called "eye pattern" is sufficiently opened. This is done by the apparatus for reproducing the received data.

FIG. 4 is a block diagram showing a conventional apparatus for reproducing received data. This conventional apparatus for reproducing received data is provided inside the network termination apparatus (NT) 11, receives as input an internally generated transmission frame timing pulse TF (generated at the rising edge of the bit F at the top section of FIG. 3) and positive received data RD+ and negative received data RD− obtained by slicing the received signal received from the bus 12 by a + side and − side threshold level (see left end in figure), and obtains as the output the reproduced received data RD obtained by sampling at the correct timing (see right end in figure). Note that the signals transmitted from the terminal equipment 13 are output in response to the transmission signal from the network termination apparatus 11.

The reproduced received data RD is obtained as the Q-output of the D-flipflop 28. The D-flipflop 28 receives at its D-input the positive and negative received data signals RD+ and RD− combined through the OR gate or receives at its CK input the clock CK from a selector 27. The clock CK is selected by the selector 27 so that the received data signals RD+ and RD− may be hit very accurately no matter which of the three types of connection modes shown in FIG. 2 is used.

That is, the selector 27 alternately selects one of the adaptive clock $CK_a$ or the fixed clock $CK_f$ and outputs it as the above clock CK. The adaptive clock $CK_a$ is output from the adaptive clock generating unit 25. In particular, this clock is selected in cases like the extended bus mode, where the time until the generation of the received frame timing pulse RF from the generation of the transmitted frame timing pulse TF is delayed over one time slot (TS). Note that one time slot (TS) is equal to one bit shown in FIG. 3 (corresponding to small square gradation). Further, the received frame timing pulse RF is output at a timing coinciding with the timing of the frame bit F in the received signal received at the network termination apparatus 11 (lower section in FIG. 3).

The adaptive clock generating unit 25 is specifically comprised of a digital phase-locked loop (DPLL) circuit. Therefore, it receives a master clock MCK and the received frame timing pulse through an RF delay unit 24. The RF delay unit 24 gives a predetermined delay to the pulse RF. The "predetermined delay" corresponds to a 2-bit offset shown between the upper section and lower section of FIG. 3. The 2-bit offset is the regulation offset which has to be applied when returning a signal received from the network termination apparatus 11 at a unit of terminal equipment 13 and sending it once again to the network termination apparatus 11.

The pulse RF given to the RF delay unit 24 is generated by an RF generating unit 22 which receives as its inputs the positive and negative received data signals RD+ and RD−.

The other clock input to the selector 27, that is, the fixed clock $CK_f$, is output from the fixed clock generating unit 26. This clock is used in a case such as the simple bus mode when the above received frame timing pulse RF can be obtained within one time slot (TS) from the transmitted frame timing pulse TF for any of the units of the subscriber terminal equipment (TE).

This fixed clock generating unit 26 outputs a clock of a fixed phase synchronized with the pulse TF.

In this way, the selector 27 selectively outputs the fixed clock $CK_f$ or the adaptive clock $CK_a$ in accordance with the bus connection mode and receives a selection signal SEL for the purpose of this selection. Further, this signal SEL is produced using a switching discrimination pulse generating unit 21 and a comparator unit 23. This generating unit 21 outputs a pulse P1 which rises after the elapse of a time corresponding to the 2-bit offset from the transmitted frame timing pulse TF and falls after the elapse of the maximum round trip delay time (4 μs) in the simple bus mode.

If the above received frame timing pulse RF is generated within a pulse width of the above pulse P1, it is judged that the pulse RF has been generated in the simple bus mode. This judgment is performed by the comparator unit 23. In accordance with the results of the judgment, a selection signal SEL of the logic "1" or "0" is output. The $CK_f$ is selected when SEL="1" and the $CK_a$ is selected when SEL="0".

As mentioned above, when a plurality of timing clocks with different phases are prepared in a network termination apparatus (NT), these timing clocks are suitably switched to achieve optimal reproduction of the received data. If this is done, however, it becomes difficult to select among the timing clocks without error. Therefore, an automatic decision/switching circuit which can automatically perform a series of operations to determine the optimal timing clock among them and switch to that optimal timing clock becomes necessary. An apparatus for reproducing received data actually incorporating such an automatic decision/switching circuit, however, becomes complicated in construction, large in size, and high in cost, and so is not practical.

The conventional apparatus for reproducing received data shown in FIG. 4 and described above was designed in view of this and features switching among two types of clocks, i.e., an adaptive clock $CK_a$ and a fixed clock $CK_f$.

In such a conventional apparatus for reproducing received data (FIG. 4), however, provision of clock generating sources for the adaptive clock $CK_a$ and the fixed clock $CK_f$ and a decision/switch means for selecting among these clocks becomes necessary. This creates the above problem of further complexity of the construction of the apparatus.

The apparatus of the present invention for solving this problem will be explained below.

FIG. 5 is a block diagram showing the basic constitution of the present invention. In the figure, 31 shows a discrimination-use pulse generating unit which receives a transmitted frame timing pulse TF and generates a predetermined discrimination-use pulse P, 32 is a self-generating fixed clock generating unit which generates a clock CLK of a fixed phase synchronized with the TF, that is, without an accompanying phase shift (equivalent to the conventional fixed clock generating unit 26), 33 is a received frame timing pulse generating unit which detects the frame bits of the received data signal and generates a received frame timing pulse RF (equivalent to conventional RF generating unit 22), 34 is a data/clock relative delay unit which discriminates the timing of appearance of the RF by P and applies a relative delay between the received data signal (RD+, RD−) and the fixed phase clock CLK, and 35 is a data sampling unit for sampling the received data signal (RD+, RD−) by the clock CLK and obtaining the reproduced received data RD (equivalent to conventional D-flipflop 28).

The points which should be particularly noted in the construction shown in the figure are that the clock source (32) for sampling the received data signals is made a single source as opposed to the plurality of sources in the past and that this is made fixed in phase with respect to the transmitted frame timing pulse TF. Also, since a single clock source is used, a data/clock relative delay unit 34 is newly introduced.

Note that FS in the figure shows the frame synchronization status signal. The signal FS is obtained from the existing frame synchronization circuit. When FS= "0", it indicates the out of frame synchronization state, while when FS="1", it indicates the frame synchronization state. MCK is the above-mentioned master clock.

Figure 6A:
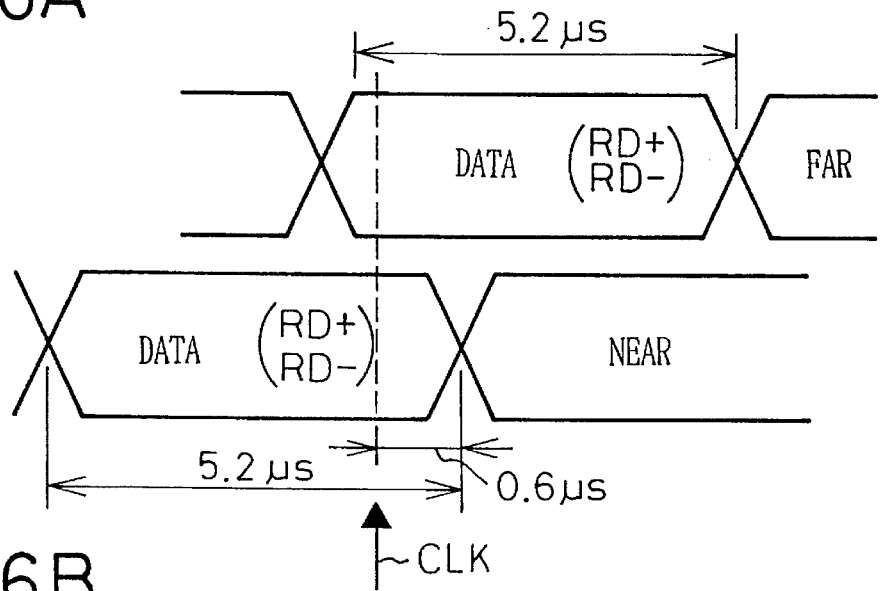
FIGS. 6A to 6C are views showing a first operation of the data/clock relative delay unit.
Figure 6B:
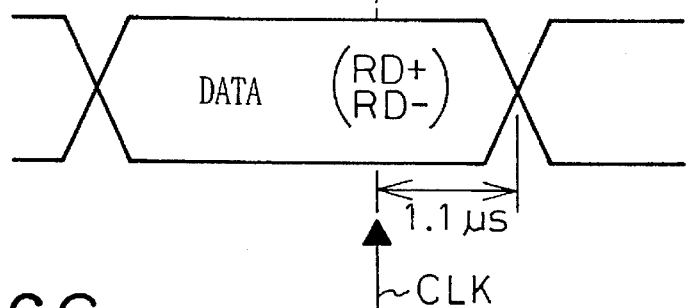
Figure 6C:
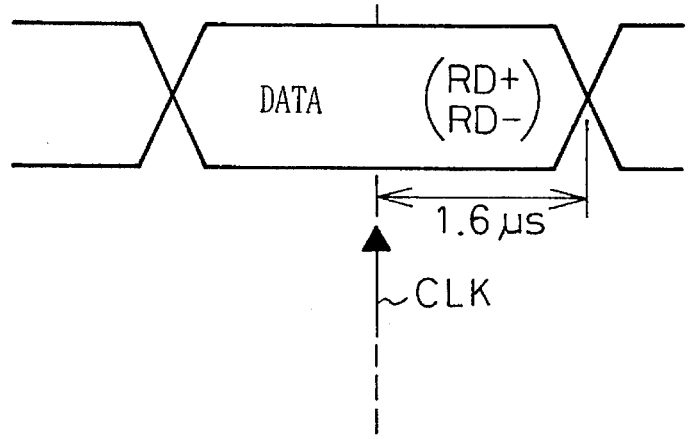
Figure 7A:
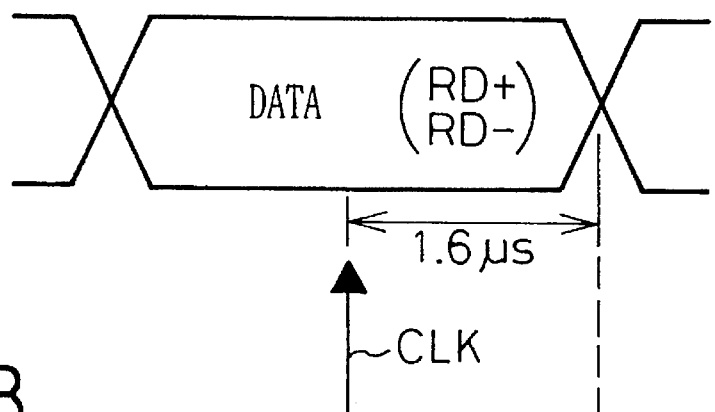
FIGS. 7A to 7C are views showing a second operation of the data/clock relative delay unit.
Figure 7B:
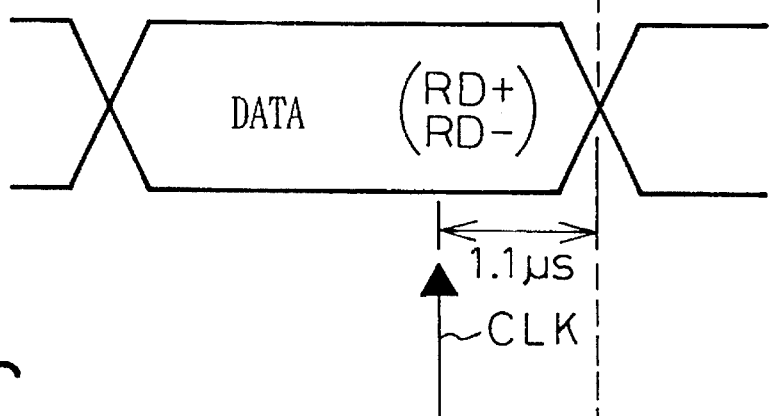
Figure 7C:
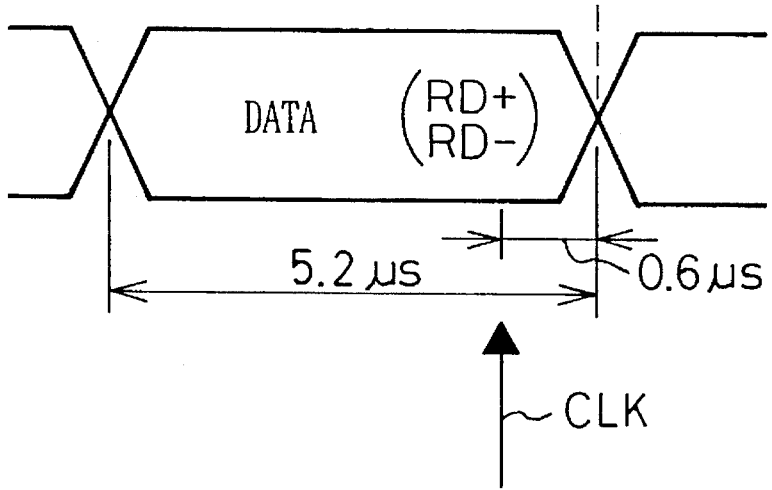

FIGS. 6A to 6C are views showing the first operation of the data/clock relative delay unit, while FIGS. 7A to 7C are views showing the second operation of the data/clock relative delay unit. The first operation shown in FIGS. 6A to 6C shows the example of making the clock CLK a fixed phase timing and applying a relative delay between the phase of the data and the phase of the clock by delaying the received data signal (RD+, RD−). On the other hand, the second part of the operation shown in FIGS. 7A to 7C shows the example of making the received data signals (RD+, RD−) a fixed phase timing and applying a relative delay between the data and clock by delaying the clock CLK. Note that the following explanation will be made taking as an example mainly the case of giving a delay to the received data signals (RD+, RD−) and making the clock CLK fixed phase.

Referring to FIGS. 6A to 6C, each of the received data signals (corresponding to the square gradations of F, D, L, B1, B2, etc. in FIG. 3) of a time slot (1 bit) of a pulse width of 5.2 μs is given a delay of, for example, 0.6 μs, 1.1 μs, 1.6 μs, etc. using as a reference the clocks CLK. Note that in the figure, the delay time is shown using as a standard the tail part of the data in accordance with the fact that the received frame timing pulse RF etc. is detected using the falling edge of the frame bit F in the received data signal.

In FIGS. 6A to 6C, the state of the sampling clocks CLK hitting spots off from the centers of the data despite aiming and supposedly hitting the centers is shown. The reason for this is, as explained above, signals from a maximum of two units of subscriber terminal equipment (TE) 13 are simultaneously transferred toward the network termination apparatus 11. The eye is opened as much as possible for both the nearest unit of terminal equipment 13 and the farthest unit of terminal equipment 13. To hit the bits F and $F_a$, as shown in FIG. 6A, it is sufficient to make the clock CLK rise at the positions off from the centers of the time slots (5.2 μs). If this is done, then both the received data signals transferred from one unit of terminal equipment by the B1 channel and the received data signals transferred from the other unit of terminal equipment by the B2 channel are hit by the common sampling clock CLK at the position where the eye is opened and therefore the correct received data RD is reproduced.

FIG. 8 is a view showing an embodiment of the present invention. The figure shows specifically the data/clock relative delay unit 34 and shows also an example of a converter circuit for converting from the received signals Sr of the AMI code to the received data signals RD+, RD−.

As explained above, the present invention is mainly described taking as an example the case of a data/clock relative delay unit 34 where the data is delayed and the clock is made fixed. Therefore, the data/clock relative delay unit 34 is comprised inside by the data delay unit 43.

The data delay unit 43 gives a predetermined phase delay to the received data signals RD+, RD− and applies the result to a data sampling unit 35 comprised of, for example, a D-flipflop 45, to obtain the reproduced received data RD.

The above predetermined phase delay is, for example, the 0.6 μs, 1.1 μs, 1.6 μs, etc. shown in FIGS. 6A to 6C. How much to make the amount of delay (time) is determined according to the output of the decision circuit 41 and the output of the terminal equipment phase difference detector 42.

The output of the decision circuit 41 is determined according to the first decision pulse P1 among the decision pulses P (comprised of the first decision pulse P1 and the second decision pulse P2) from the decision pulse generating unit 31, the clock CLK from the fixed clock generating unit 32, and the RF from the received frame timing pulse (RF) generating unit 33 and for example is output as two types of signals, that is, the "simple" signal and the "delay 1 to 6" signals.

If the received frame timing pulse RF falls within 10 μs to 14 μs (first decision pulse) from the transmitted frame timing pulse TF, the group of subscriber terminal equipment (TE) 13 is connected by the simple bus mode of FIG. 2A and the "simple" signal becomes "0". The value of 10 μs is a time corresponding to the 2-bit offset mentioned earlier. The value of 4 μs obtained by subtracting this 10 μs from the above 14 μs corresponds to the maximum round trip time in the simple bus mode. When the "simple" signal is "0", no relative delay is given between the data and clock.

If the received frame timing pulse RF does not fall within the above first decision pulse P1, the subscriber terminal equipment (TE) group 13 is connected by a bus mode other than the simple bus mode, so the "simple" signal becomes "1", the received data signals RD+, RD− are uniformly given a delay (delay determined by "delay 1 to 6" signals), and coarse delay control is performed.

If the above operation results in coarse adjustment of the data/clock relative delay, then it is naturally more preferable to apply further fine adjustment. Toward this end, the terminal equipment phase difference detector 42 is provided. This outputs the selection signals SEL1 and SEL2 for fine adjustment from the second decision pulse P2 out of the above decision pulses P and the received data signals RD+ and RD−.

The selection signals SEL1 and SEL2 show how much of a phase difference there is between the received data signals from the nearest unit of terminal equipment (one closest to network termination apparatus 11) among the units of subscriber terminal equipment (TE) 13 connected to the bus 12 and the received data signals from the farthest unit of terminal equipment, that is, the distance between the two units of terminal equipment. If the distance between the nearest unit of terminal equipment and the farthest unit of terminal equipment is very small, then as shown in FIG. 6C data can be hit by the clock CLK with ease, while when the nearest unit of terminal equipment and the farthest unit of terminal equipment are considerably apart, then the hitting must be done by the phase shown in FIG. 6A or else it will not be possible to hit the data at the open eye pattern for either the nearest unit of terminal equipment or the farthest unit of terminal equipment. Note that the principle of detection of the phase difference between the units of terminal equipment according to the present invention will be described later.

At the bottom left of FIG. 8, there is shown the example of a conversion circuit 44 for obtaining the received data signals RD+, RD− from the AMI coded received signals Sr (see digital waveform in Table 1). As shown in the figure, this is comprised of two comparators 46+ and 46− and a slice voltage generating circuit (voltage dividing circuit) 47. The slice voltage $V_{th}$ and the received signal Sr are input commonly to the comparators 46+ and 46−, but with alternate switching of the inverting input and noninverting input.

Figure 9:
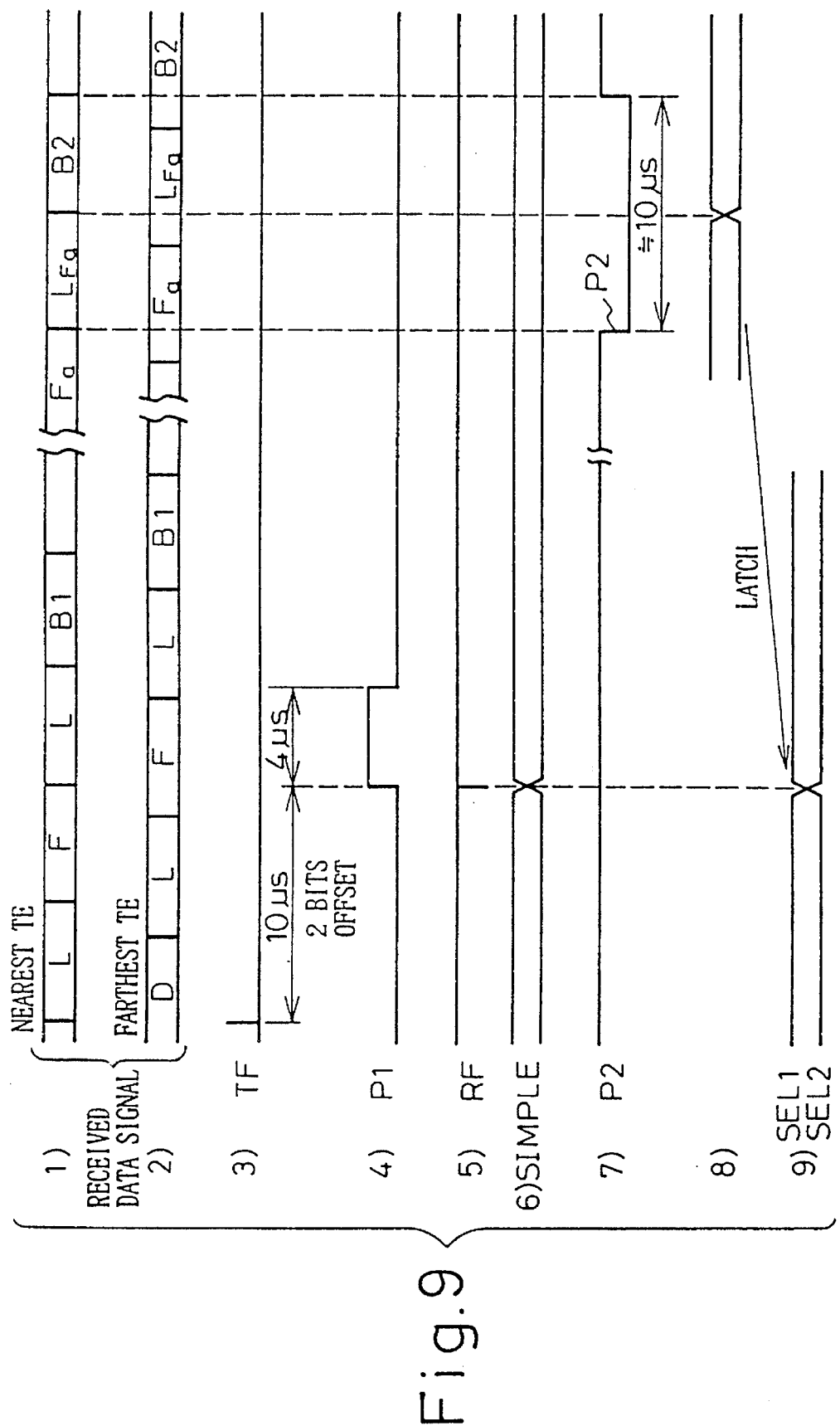
FIG. 9 is a time chart for explaining the operation of the embodiment of FIG. 8.

FIG. 9 is a time chart for explaining the operation of the embodiment of FIG. 8. The meanings of 1) to 9) in the figure are as follows:

1) Shows the received data signals (RD+, RD−) sent from the nearest unit of subscriber terminal equipment (TE) 13 at the position nearest to the network termination apparatus (NT) 11, for example, shows the bit L to the bit B2 in one frame.

2) Like the above 1), shows the received data signals of the farthest unit of terminal equipment.

A phase difference proportional to the distance between the nearest unit of terminal equipment and the farthest unit of terminal equipment occurs.

3) Shows the transmitted frame timing pulse TF mentioned above.

4) Shows the above-mentioned first decision pulse P1, in particular, the 4 μs width pulse is the pulse P1. The 10 μs (offset time) and 4 μs (maximum round trip time) shown here are as already explained. In other words, the first decision pulse P1 is the pulse defined in the range of 10 μs–14 μs).

5) Shows the received frame timing pulse RF mentioned above. This pulse RF is obtained for the nearest unit of terminal equipment and the farthest unit of terminal equipment, but the one for the nearest unit of terminal equipment is effective. This is because by determining at what timing the RF for the nearest unit of terminal equipment appears, it is possible to roughly discriminate the bus mode.

In this figure too, the state is shown where the RF appears at the falling edge of the frame bit F of the received data signal from the nearest unit of terminal equipment.

6) Shows the "simple" signal of FIG. 8, by which a decision is made to if the connection is by a simple bus at the time of generation of the above RF ("0" if simple bus mode, while "1" if other than simple bus mode).

7) Shows the above-mentioned second decision pulse P2, which has a pulse width of about 10 μs. By monitoring the bit $L_{Fa}$ of the nearest unit of terminal equipment and the bit $L_{Fa}$ of the farthest unit of terminal equipment in the pulse P2, the phase difference between units of terminal equipment is measured in detail. The principle of measurement is unique to the present invention and will be explained below.

The bit $L_{Fa}$ is not shown in FIG. 3 and is defined for the first time in the present invention. $L_{Fa}$ means the DC balancing bit (L) appearing right after the auxiliary framing bit $F_a$ among the plurality of DC balancing bits L.

Generally speaking, the above-mentioned second decision pulse P2 designates a particular bit position where the pair of received data signals RD+ and RD− collide with opposite polarities. The conditions of the bit position are for example satisfied by the above bit $L_{Fa}$. The trailing edge of the pulse P2 of 7) is measured from TF and is after 14 (bits)×5.2 μs.

8) The information on the phase difference between units of terminal equipment from the terminal equipment phase difference detector 42 is finalized at the bit position of the above second decision pulse P2. It is not possible to draw the final determination of the terminal equipment phase difference information of the preceding frame due to the limited space in the figure, so this is shown by 8). Therefore, the state of the previous frame shown by 8) is latched and used as the current terminal equipment phase difference information.

9) The terminal equipment phase difference information latched above becomes the fore-mentioned current selection signals SEL1 and SEL2.

Figure 10:
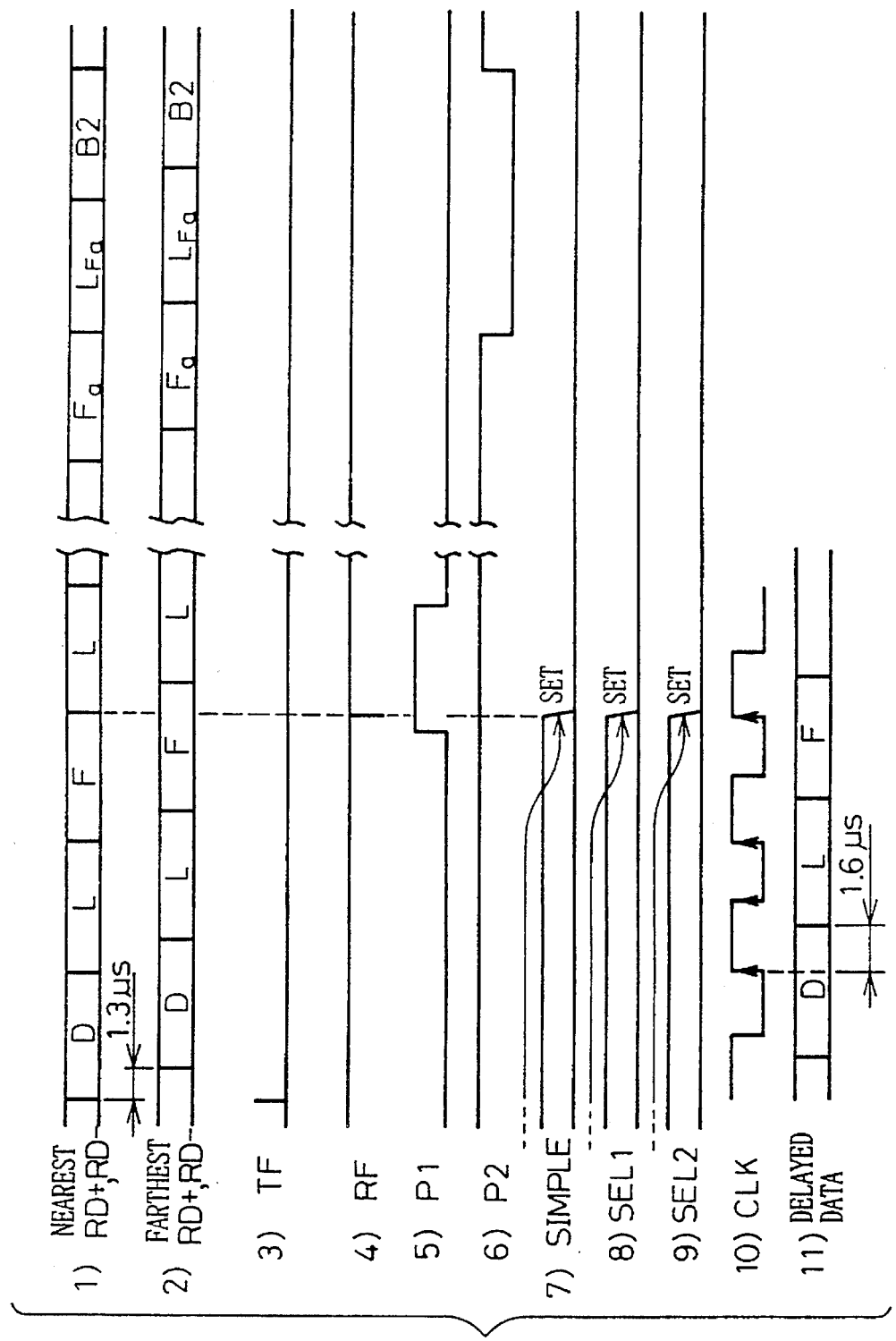
FIG. 10 is a time chart showing the operation of the data/clock relative delay unit and data sampling unit of FIG. 8.

FIG. 10 is a time chart showing the operation of the data/clock relative delay unit and data sampling unit of FIG. 8. Compared with FIG. 9, 7) to 11) in FIG. 10 are time charts not shown in FIG. 9. The portions overlapping with FIG. 9 (1) to 6) in FIG. 10), however, are shown together for convenience.

At 7) in FIG. 10, the content of the "simple" signal is finalized as "0" or "1" by the generation of the received frame timing pulse RF shown in 4). That is, the "simple" signal is set in the data delay unit 43 of FIG. 8.

At 8) and 9) of FIG. 10, as shown in 9) of FIG. 9, the values of the selection signals SEL1 and SEL2 determined at the immediately preceding frame (output of the terminal equipment phase difference detector 42 of FIG. 8) are set in the data delay unit 43 at the present timing illustrated.

The selection signals SEL1 and SEL2 are each one bit and total 2 bits in all. They can express a maximum of 4 ($2^2$) terminal equipment phase differences in all. In practice, for example, the following three combinations are used:

| SEL1 | SEL2 | Phase difference between terminal equipment |
|---|---|---|
| 0 | 0 | 0 to 2 μs |
| 0 | 1 | 2 to 3 μs |
| 1 | 1 | 3 to 4 μs |

Therefore, the selection signals SEL1 and SEL2 can specify three types of delays in accordance with the above for the data delay unit 43 (FIG. 8).

10) in FIG. 10 shows the clock CLK from the fixed clock generating unit 32. The phase of the clock CLK is fixed and the delayed data is hit at the rising edges. The hitting is performed by the data sampling unit 35 of FIG. 8.

11) in FIG. 10 is the delayed data, that is, the output from the data delay unit 43 in FIG. 8. This figure shows the example of a delay of the delayed data of 1.6 μs when the phase difference between the nearest unit of terminal equipment and the farthest unit of terminal equipment is 1.3 μs.

The fact that the amount of delay is suitably selected in accordance with the phase difference between the nearest unit of subscriber terminal equipment (TE) and the farthest unit of terminal equipment was explained earlier. For example, a maximum of four (in practice, 3) phase differences can be expressed by two bits of signals SEL1 and SEL2.

As mentioned earlier too, how much of a phase difference there is detected by the terminal equipment phase difference detector 42 of FIG. 8. The principle of this will be explained here.

Generally speaking, as mentioned earlier, the above phase difference can be detected at a particular bit where the pair of received data signals RD+ and RD− collide with each other with opposite polarities.

Figure 11:
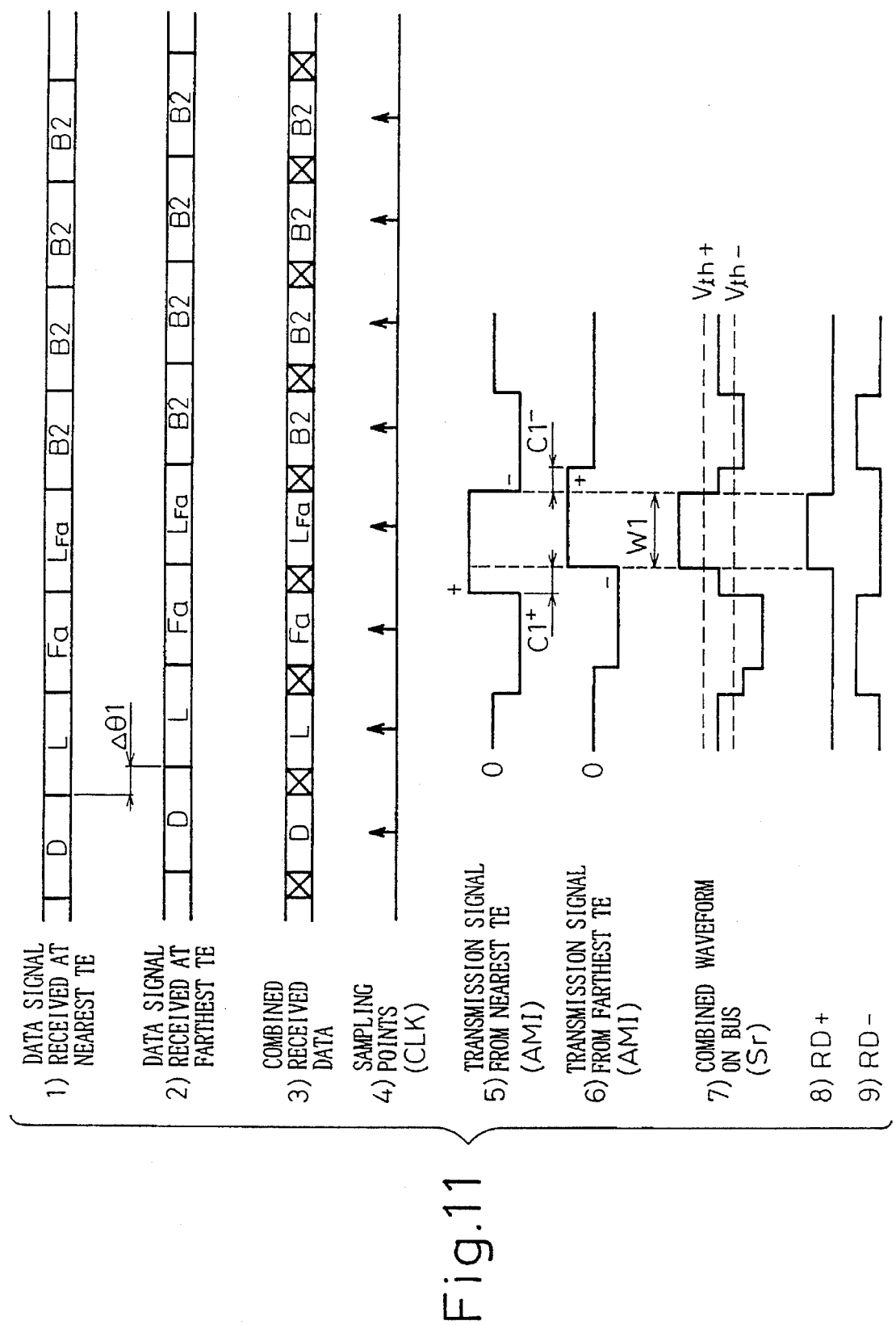
FIG. 11 is a view explaining the principle of detection (first) of the phase difference between units of terminal equipment.
Figure 12:
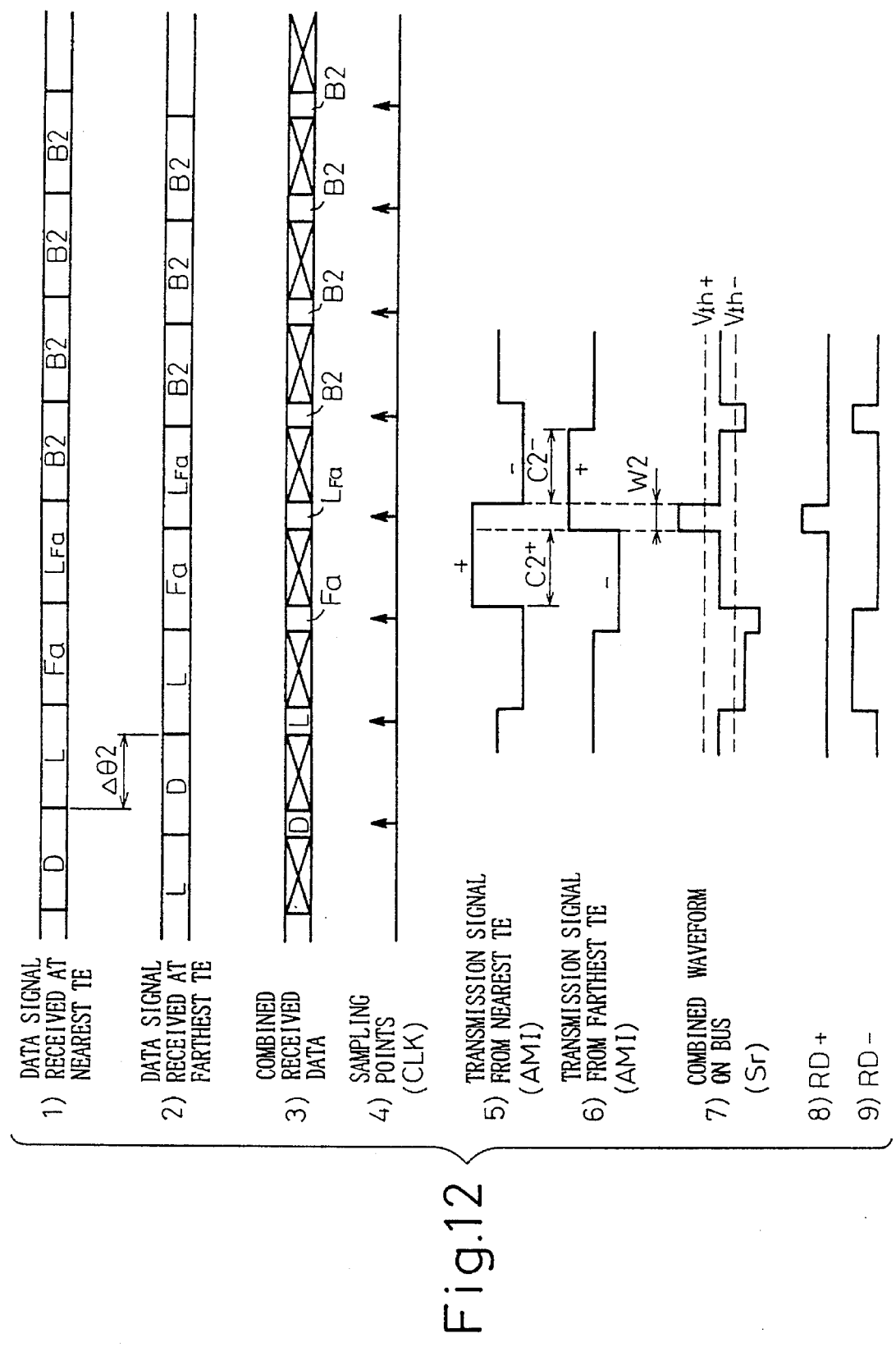
FIG. 12 is a view explaining the principle of detection (second) of the phase difference between units of terminal equipment.

FIG. 11 is a view explaining the principle of detection (first) of the phase difference between units of terminal equipment, and FIG. 12 is a view explaining the principle of detection (second) of the phase difference between units of terminal equipment. The contents of 1) to 9) in FIG. 11 correspond one-to-one with the contents of 1) to 9) in FIG. 12. FIG. 11 shows the case when the phase difference between units of terminal equipment is small, while FIG. 12 shows the case when the phase difference between units of terminal equipment is large. That is, comparing the phase difference Δθ1 between 1) in FIG. 11 (nearest terminal equipment received data signal) and 2) of FIG. 11 (farthest terminal equipment received data signal) and the phase difference Δθ2 between the signal of 1) and the signal of 2) of FIG. 12, Δθ1<Δθ2.

The principle of detection of the phase difference based on the present invention, giving the conclusion first, takes note of the fact that the pulse width W1 of the combined waveform on the bus shown by 7) in FIG. 11 is large and the pulse width W2 of the combined waveform on the bus shown by 7) of FIG. 12 is small. That is, the relationships of

Δθ1<Δθ2

W1>W2 are obtained, so the phase difference between units of terminal equipment may be found from the pulse widths (W1, W2).

The pulse widths (W1, W2) are the pulse widths of the waveforms obtained by combining the signals of 5) and 6) in FIGS. 11 and 12 on the bus 12. Here, 5) is the transmitted signal from the nearest unit of subscriber terminal equipment (TE) (AMI coded bipolar signal) and 6) is the transmitted signal from the farthest unit of terminal equipment 13 (also AMI coded bipolar signal).

Studying the bipolar signal of 5) and the bipolar signal of 6), it is learned that there are portions between them where they collide with each other with opposite polarities The portions shown as C1$^+$, C1$^-$, and C2$^+$, C2$^-$ in the middle of the sections 5) and 6) in FIGS. 11 and 12 are the portions where they collide with each other with opposite polarities.

These portions of collision with opposite polarities cancel each other out. In the end, in the case of FIG. 11, the combined waveform of the pulse width W1 remains, while in the case of FIG. 12, the combined waveform of the pulse width W2 remains.

Note that the received data signals RD+ and RD− shown by 8) and 9) in FIG. 11 (completely same in FIG. 12) are signals obtained by slicing the combined waveform ($S_r$) of 7) by the slice voltage $V_{th}$ at the comparators 46+ and 46− of FIG. 8. Of them, the received data signal RD+ continues to hold the information of the above pulse width (W1). That is, if the pulse width of RD+ of this particular bit position ($L_{Fa}$) is monitored, the phase difference between units of terminal equipment can be learned.

Even if the pulse width of the received data signal RD+ is monitored at a timing other than this particular bit position ($L_{Fa}$), the desired phase difference between units of terminal equipment cannot be found. The reason is that at bits other than this particular bit, there is no guarantee that the transmitted signals of the nearest unit of terminal equipment and the farthest unit of terminal equipment will collide with opposite polarities.

Conversely, at the bit position of $L_{Fa}$, there always appear portions of collision at opposite polarities as shown by C1$^+$, C1$^-$ (C2$^+$, C2$^-$) That is, there is always a pulse at $L_{Fa}$, that is, the logic is always "0" (see transmission waveform in Table 1, where pulse exists at each logic "0"). The reason why there is always a pulse at $L_{Fa}$ is that there is an agreement that the header bit (first bit of B2) of the B2 channel which begins right after the auxiliary frame bit $F_a$ always start from − (minus). Therefore, the DC balancing bit ($L_{Fa}$) for obtaining DC balance with the first bit always has a pulse (+).

Note that 3) in FIG. 11 shows the combined signal of the received data signal of the nearest unit of terminal equipment and the received data signal of the farthest unit of terminal equipment. In FIG. 11, where Δθ1 is small, the effective pulse width of the combined signal is large (taking note of the bit L, for example, a width able to commonly cover both the bit L of the nearest unit of terminal equipment and the bit L of the farthest unit of terminal equipment). Note that the clock CLK (sampling point) desirably is as close to the center of the effective pulse width as possible. Further, as shown in 3) of the case of FIG. 12 with the large Δθ2, the effective pulse width of the combined signal is small and there is little extra margin at the clock CLK (sampling point) of 4) of the figure where the center is hit.

The above explanation applies to the extended bus and simple bus on which at least the nearest subscriber terminal equipment (TE) and the farthest unit of terminal equipment are present and does not apply to the point-to-point bus where there is only one unit of terminal equipment. Referring once more to FIG. 11, however, a point-to-point bus corresponds to the case where only one of 1) and 2) of that figure is present, so corresponds to the case where only one of 5) and 6) is present, so as a result the above explanation similarly applies to the point-to-point bus. That is, it may be considered that Δθ1→0 in FIG. 11.

The above description was concerned with the basic concept of the present invention. Next, an explanation will be made of specific examples of the present invention.

Figure 13:
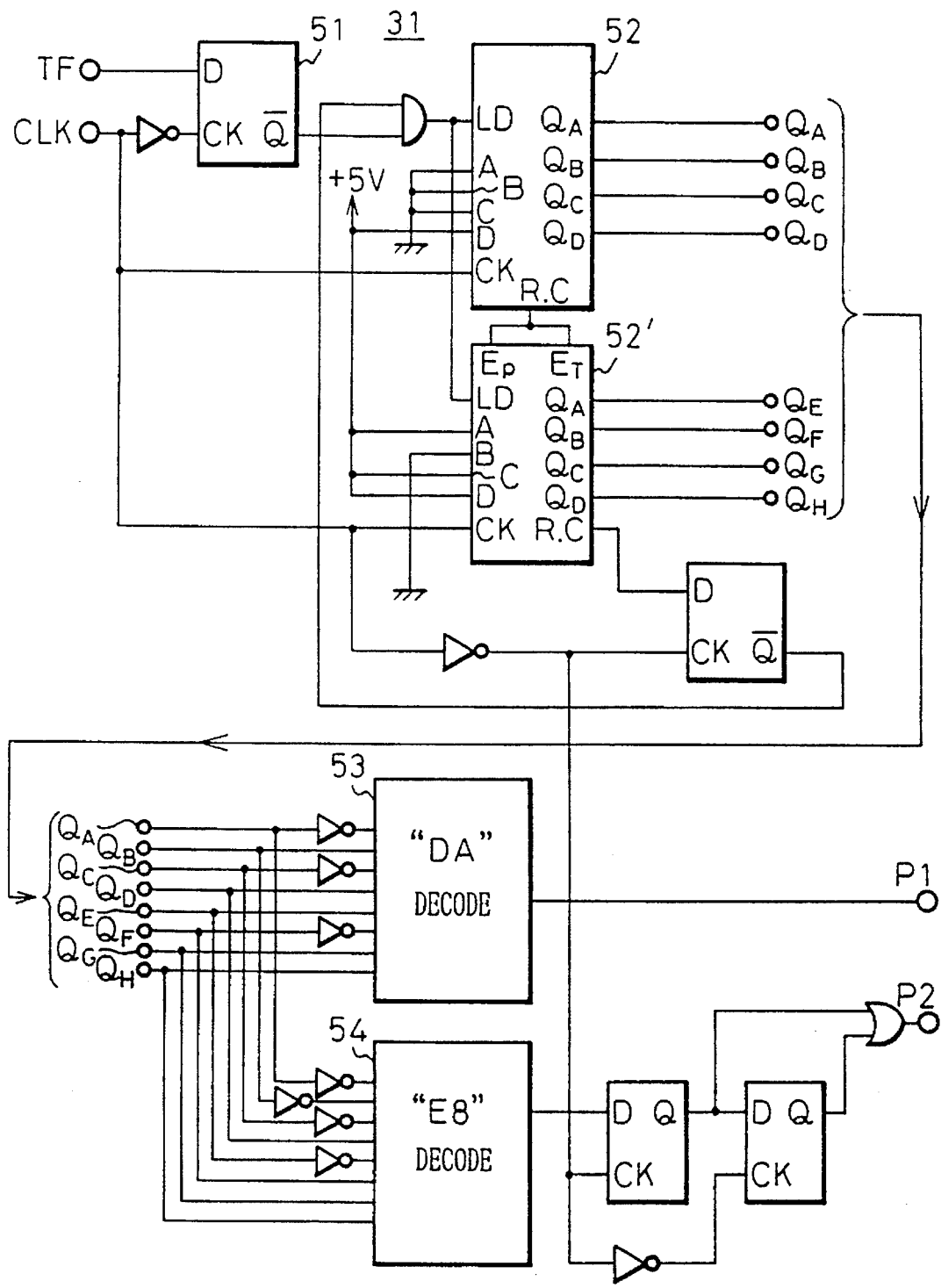
FIG. 13 is a view showing a specific example of a discrimination-use pulse generating unit.

FIG. 13 is a view showing a specific example of the discrimination-use pulse generating unit 31 shown in FIG. 8. The unit receives as input the transmitted frame timing pulse TF and the clock CLK and outputs the pulses P1 and P2. In the figure, 52 and 52' are counters for counting 40 bits (total number of bits composing one frame). The counters are comprised of 4-bit counters, so two counters are required for counting 40 bits.

The D-flipflop 51 performs initial loading of the counters 52 and 52' at the timing of the transmitted frame timing pulse TF.

Reference numerals 53 and 54 are 8-input OR circuits and decode the values of "DA" (hexadecimal) and "EA" (hexadecimal).

The OR circuit 53 outputs the pulse P1 and the OR circuit 54 outputs the pulse P2.

Figure 14:
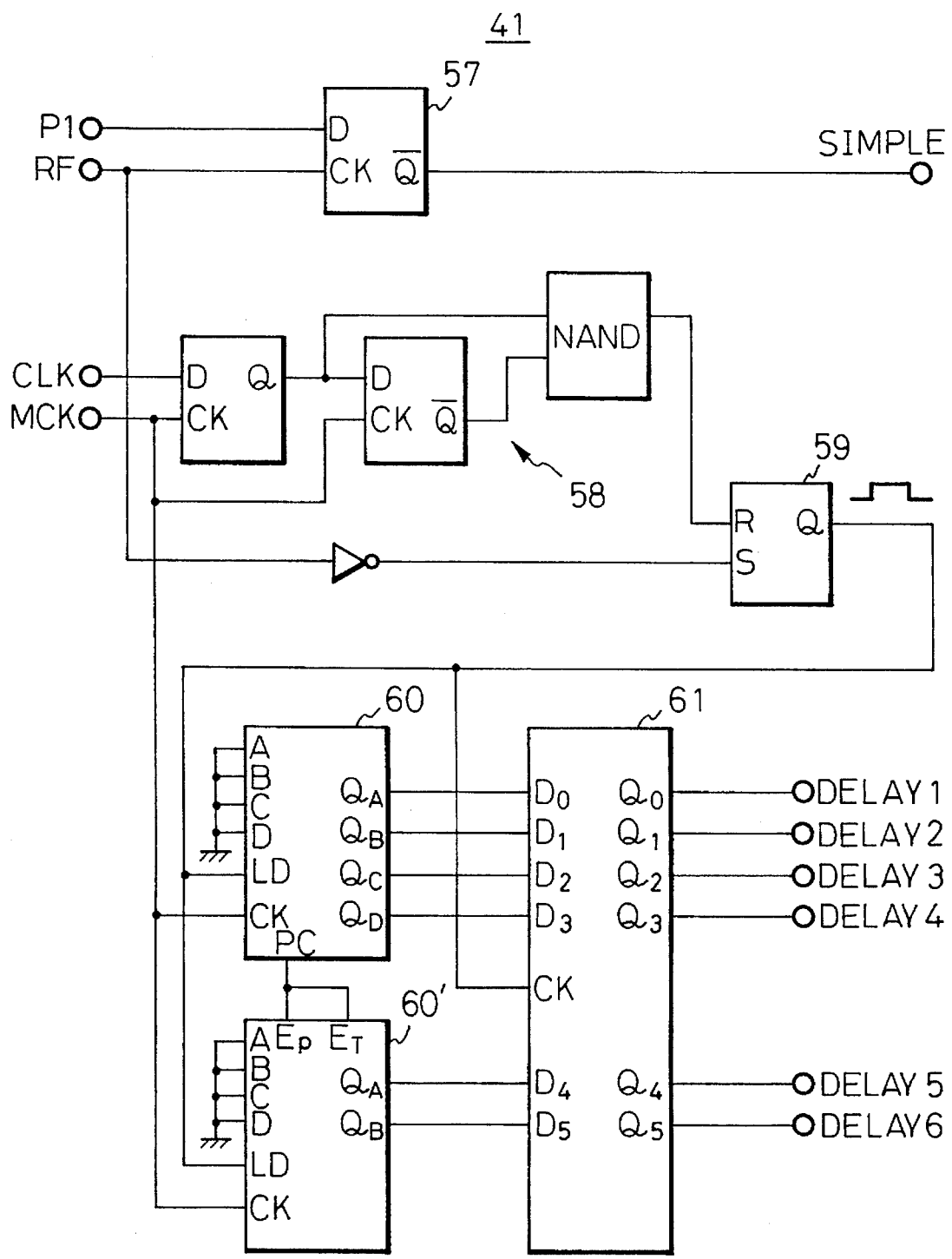
FIG. 14 is a view showing a specific example of a decision circuit.

FIG. 14 is a view showing a specific example of a decision circuit 41 in FIG. 8. This circuit receives as input the pulses and clocks P1, RF, CLK, and MCK and outputs the 6 bits of information signals showing the amount of delay, that is, the "delay 1 to 6" signals.

The D-flipflop 57 outputs the "simple" signal ("0") if the received frame timing pulse RF is within the pulse width of P1.

The differentiating circuit 58 comprised of the D-flipflop and the NAND produces the rising pulse of the clock CLK. The S-R flipflop 59 is reset by the differential pulse (rising pulse), but is set before that by the received frame timing pulse RF. Therefore, the pulse width of the pulse from the Q-output of the flipflop 59 expresses the distance from the nearest unit of terminal equipment (TE) 13 and the network termination apparatus 11.

Reference numerals 60 and 60' each show 4-bit counters. The two count 40 bits (1 frame), but the timing of the start of the count changes to become faster or slower proportionally to the pulse width of the Q-output.

Reference numeral 61 is an 8-input flipflop circuit which holds the values of the counters 60 and 61' reliably for 1 frame.

Figure 15:
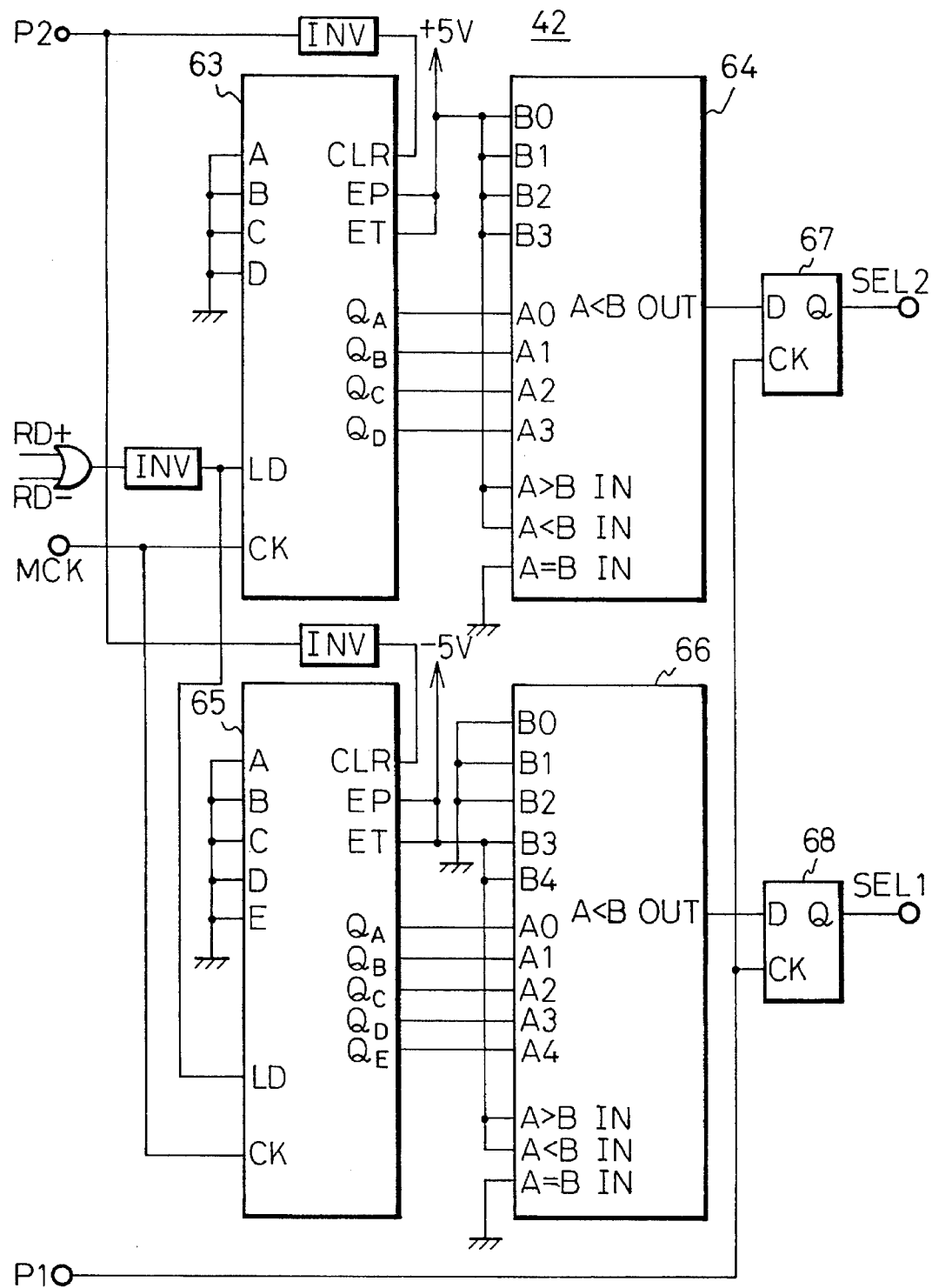
FIG. 15 is a view showing a specific example of a detector for the phase difference between units of terminal equipment.

FIG. 15 is a view showing a specific example of a terminal equipment phase difference detector 42 in FIG. 8. The detector receives as input the pulses, signals, and clocks P2, RD+, RD−, MCK, and P1 and outputs a total of 2 bits, that is, the selection signal SEL1 and SEL2. These SEL1 and SEL3 are signals for fine adjustment, mentioned above (in FIG. 14, signals for coarse adjustment).

Reference numeral 63 is a 4-bit counter, 64 is a 4-bit comparator, 65 is a 5-bit counter, and 66 is a 5-bit comparator. It is investigated which range of the above mentioned 0 to 2 µs, 2 to 3 µs, and 3 to 4 µs the pulse width W1 shown in FIG. 11 and the pulse width W2 shown in FIG. 12 fall. The 4-bit counter 63 detects the timing of the front edge portion of the pulses (W1, W2), while the 5-bit counter 65 detects the timing of the rear edge portion.

Whether the front edge portion is present after or before a predetermined reference time for decision of the front edge portion is detected by the comparator 64, while whether the rear edge portion is present after or before a predetermined reference time for decision of the rear edge portion is detected by the comparator 66. The results of the detection (SEL1, SEL2) are held in one frame by the D-flipflops 67 and 68.

Figure 16:
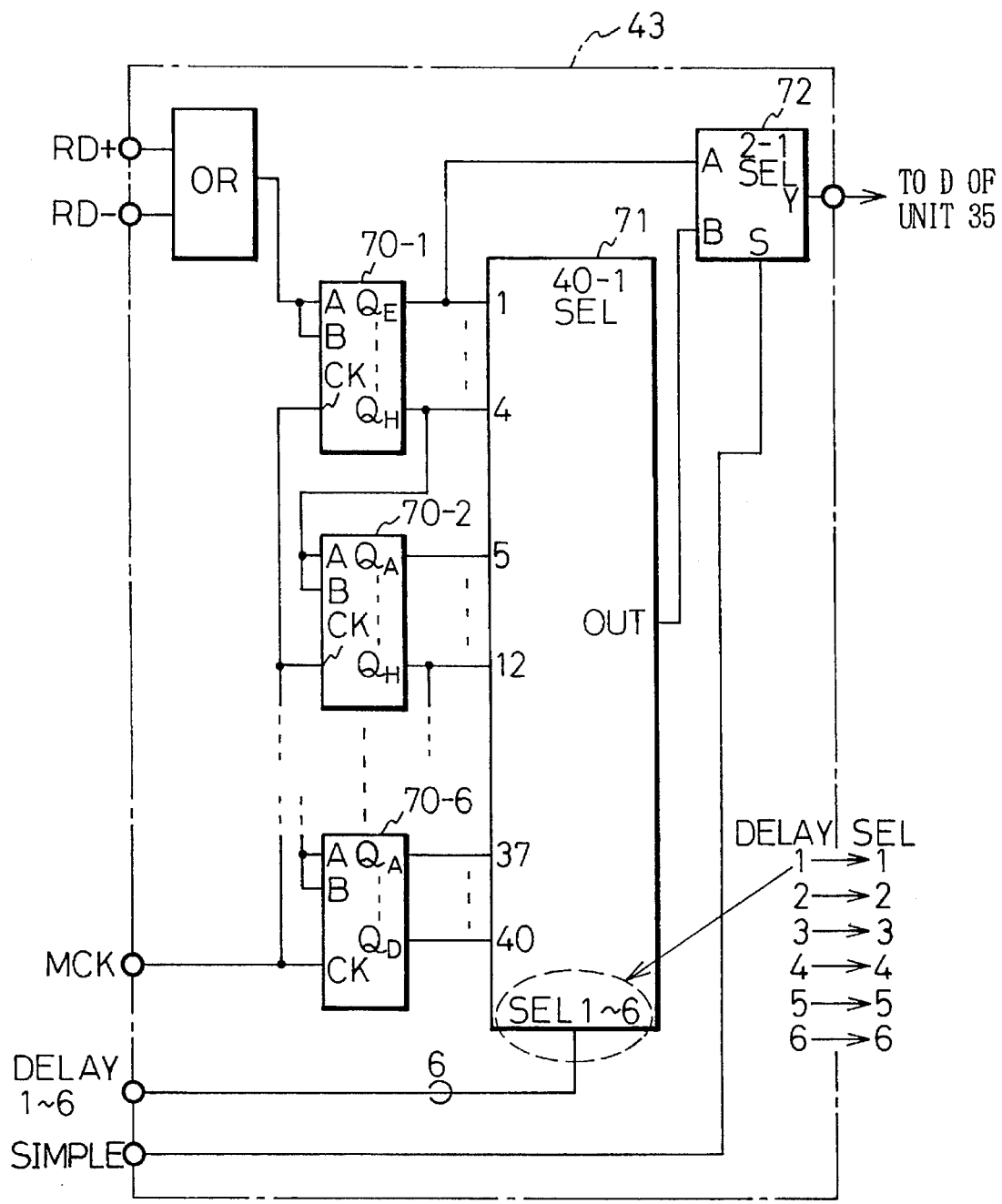
FIG. 16 is a view showing a specific example of a data delay circuit (only for coarse adjustment)

FIG. 16 is a view showing a specific example of a data delay circuit (only for coarse adjustment) 43. It shows the case, however, of only coarse adjustment with no consideration of the SEL1 and SEL2 in FIG. 8.

The received data signals RD+, RD− logically added by the OR gate are input to the first stage 8-bit shift register 70-1. This register 70-1 together with the later stages of 8-bit shift registers 70-2 to 70-6 connected in cascade to it constitute overall a six-stage shift register. The further along from the first stage shift register 70-1 to the sixth stage shift register 70-6, the greater the delay of the received data signals becomes. Overall, 40 stages of delay are available. One among these delays is selected by the 40-1 selector (SEL) 71. Which of these to select is determined by the "delay 1 to 6" signals forming the above-mentioned 6-bit information.

The 2-1 selector (SEL) 72 selects the A input when the "simple" signal is "0" (in the case of a simple bus mode). The A input is the output of the first stage of the register 70-1. The amount of delay given to the received data signal is about 0.

On the other hand, when the "simple" signal is "1", the B input is selected and a signal given a predetermined delay by the "delay 1 to 6" signals is input as the delayed data (11 in FIG. 10) from the output Y to the data sampling unit 35.

Figure 17:
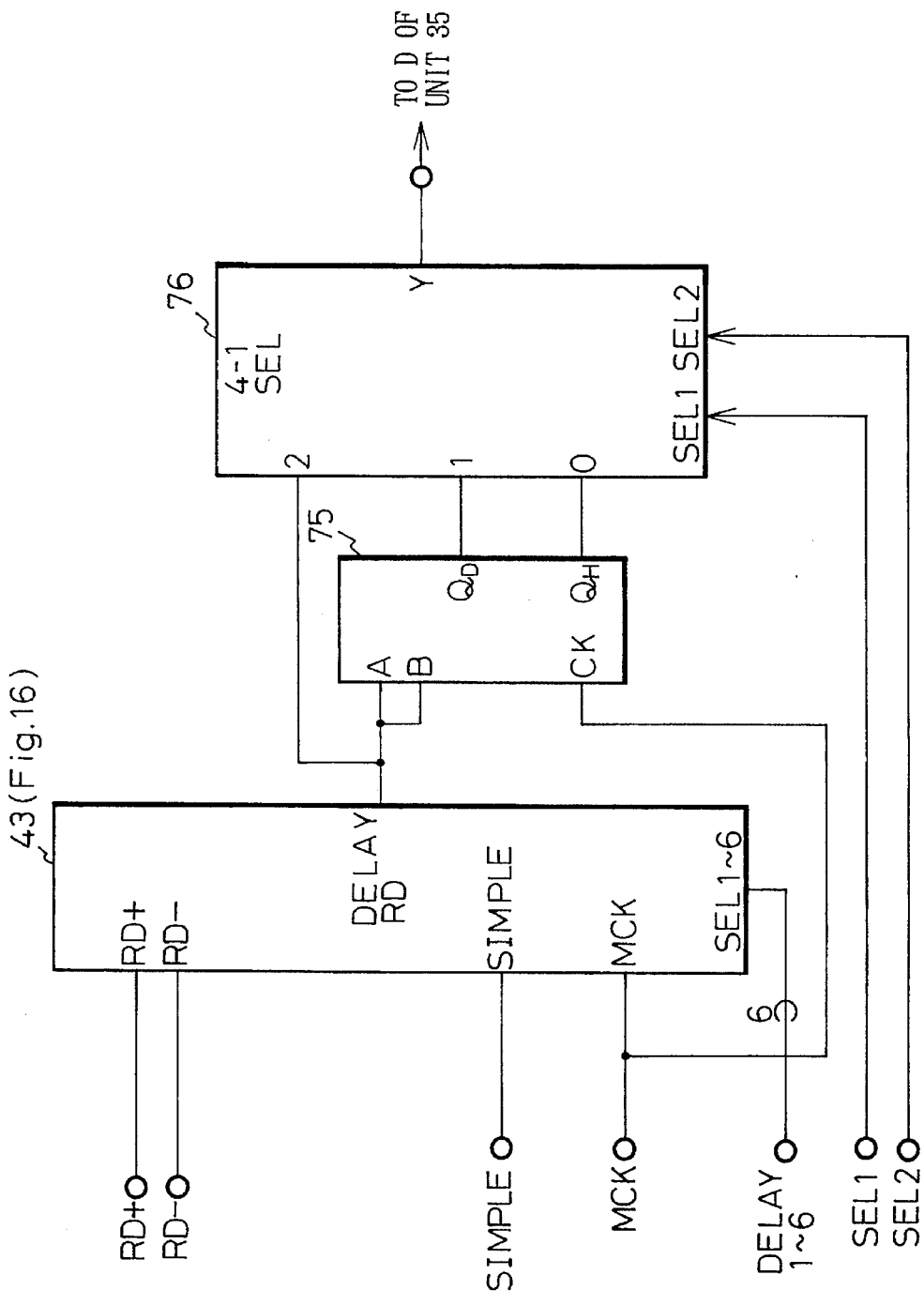
FIG. 17 is a view showing a specific example of the data delay circuit.

FIG. 17 is a view showing a specific example of the data delay circuit 43 in FIG. 8. The block 43 in the figure is the data delay unit shown in FIG. 16 itself. The 8-bit shift register 75 and the 4-1 selector (SEL) 76 added here function for the fine adjustment applied on top of the above-mentioned coarse adjustment.

In other words, the shift register 75 makes fine adjustments of a maximum 8 bits to the output of the delay unit 43 of FIG. 16 in units corresponding to 1 bit of the master clock MCK (for example, 130 nS when 7.6 MHz).

The selector 76 selects from the three inputs the single input designated by the signals SEL1 and the SEL2 and inputs the same from the output Y to the data sampling unit 35.

As mentioned earlier, the present invention is described taking as an example the case of giving a delay to the received data signals (RD+, RD−) and making the clock CLK fixed phase.

However, conversely, it is also possible to achieve the same goal by making the received data signals (RD+, RD−) fixed phase and giving a requisite delay to the clock CLK. The method of determining the amount of delay may be exactly the same as described above.

Figure 18:
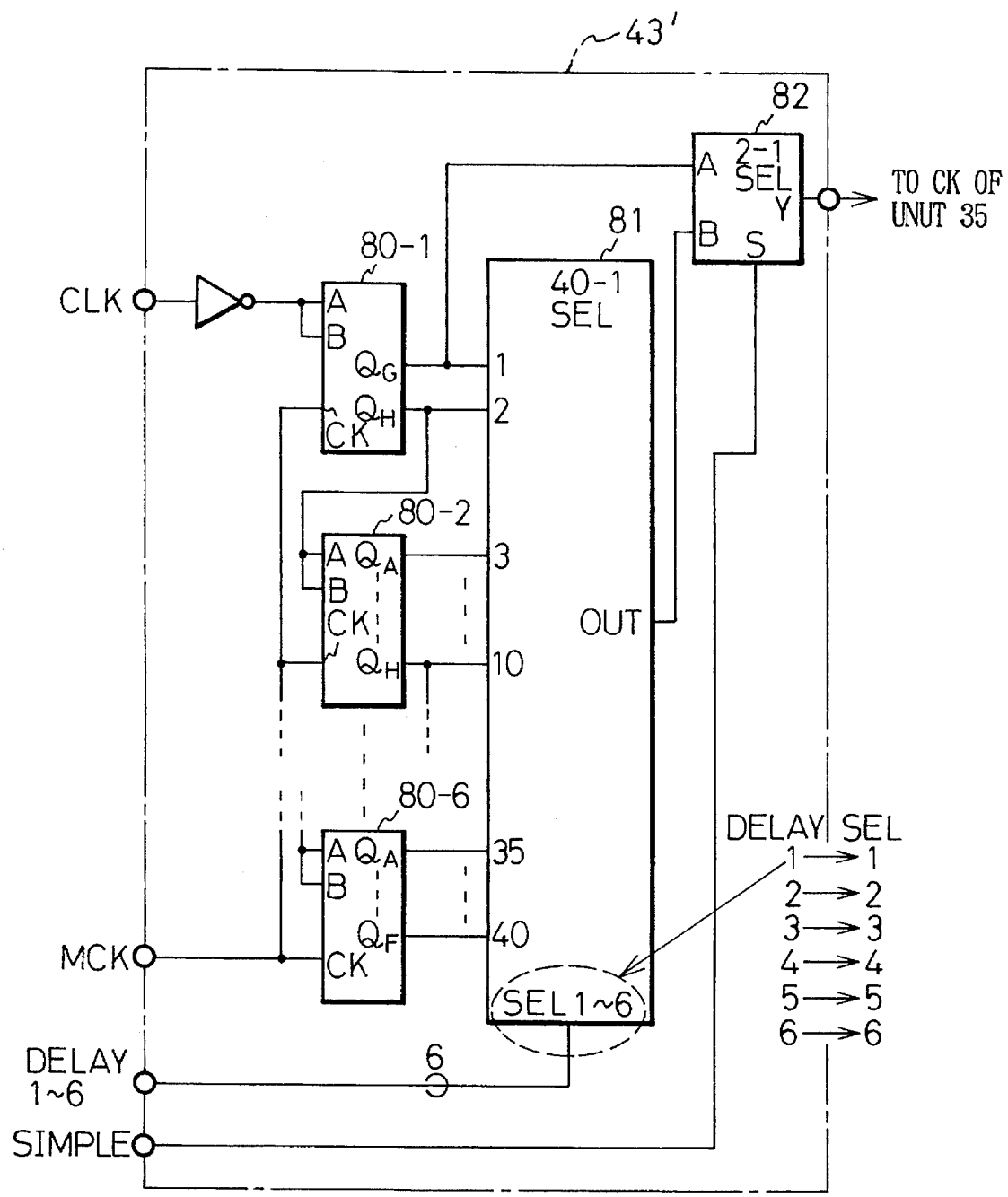
FIG. 18 is a view showing a specific example (only for coarse adjustment) of a data/clock relative delay unit (delay applied to clock)

FIG. 18 is a view showing a specific example (only for coarse adjustment) of a data/clock relative delay unit (delay applied to clock). Shown, however, is the case of coarse adjustment alone with no consideration given to the signals SEL1 and SEL2 in FIG. 8.

The group of input side signals and the internal construction of the clock delay unit 43' of FIG. 18 are completely the same as in the case of FIG. 16. The output of FIG. 18 (delayed clock), however, is given to the clock input CK of the data sampling unit 35.

Therefore, the 8-bit shift registers 80-1 to 80-6, the 40-1 selector (SEL) 81, and the 2-1 selector (SEL) 82 have the same function as the 8-bit shift registers 70-1 to 70-6, the 40-1 selector (SEL) 71, and the 2-1 selector (SEL) 72 of FIG. 16.

Figure 19:
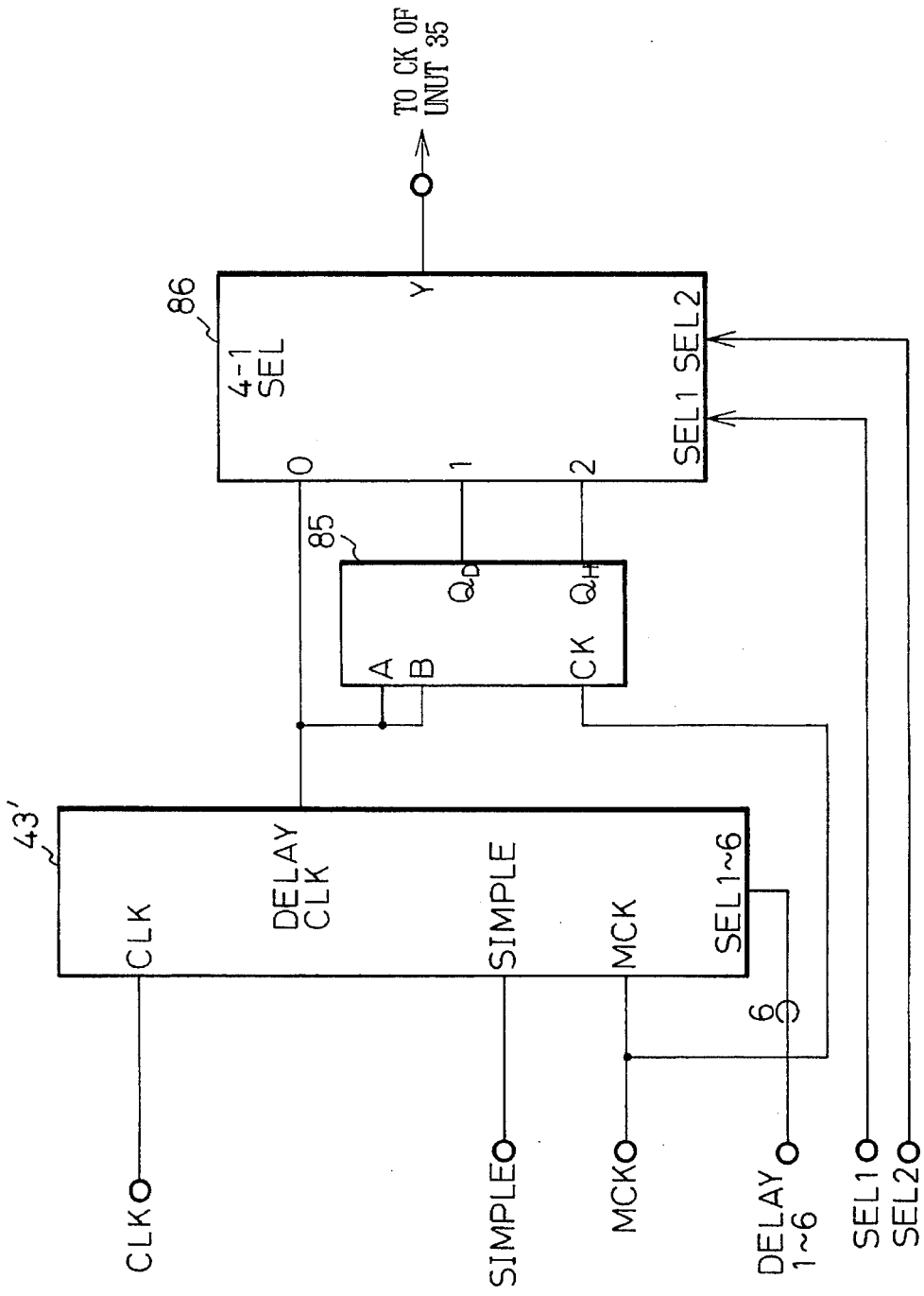
FIG. 19 is a view showing a specific example of the case of further application of fine adjustment to the constitution of FIG. 18.

FIG. 19 is a view showing a specific example of the case of further application of fine adjustment to the constitution of FIG. 18. The block 43' in the figure is the data delay unit shown in FIG. 18 itself. The 8-bit shift register 85 added here and the 4-1 selector (SEL) 86 function for fine adjustment applied on top of the above-mentioned coarse adjustment.

That is, the shift register 85 enables fine adjustment of a maximum 8 bits to the output of the delay device* 43' in units corresponding to 1 bit (for example, 130 nS in the case of 7.6 MHz) of the master clock MCK.

The selector 86 selects one input from among the three inputs, as designated by the signals SEL1 and SEL2, and inputs the same to the CK of the data sampling unit from the output Y.

As explained above, according to the present invention, there is no need for two types of clocks, the adaptive clock $CK_a$ and the fixed clock $CK_f$, as in the past. A single fixed clock generating source is sufficient by itself. Therefore, there is no need for a decision/switching means for selecting the clocks and the construction of the received data reproducing apparatus becomes simpler.

Further, the present invention enables fine adjustment in accordance with the phase difference between units of terminal equipment in addition to the rough, coarse adjustment in accordance with the type of bus and therefore the quality of the reproduced received data is improved further.

I claim:

1. An apparatus for reproducing received data which received transmitted signals from a plurality of slave stations at a master station connected to the plurality of slave stations by a bus mode and samples the received data signals by clock signals to obtain the reproduced received data, comprising:

a single fixed clock generating unit for generating the clock signals, a data sampling unit which receives as input the above received data signals, and samples said data signals at intervals defined by said single fixed clock generating unit, and outputs the reproduced received data, and a relative delay unit coupled to the data sampling unit and causing a relative delay between a phase of said received data signals and a phase of said clock signals.

2. An apparatus for reproducing received data which received transmitted signals from a plurality of slave stations at a master station connected to the plurality of slave stations by a bus mode and samples the received data signals by clock signals to obtain the reproduced received data, comprising:

a single fixed clock generating unit for generating the clock signals, a data sampling unit which receives as input the above received data signals, and samples said data signals at intervals defined by said single fixed clock generating unit, and outputs the reproduced received data, a relative delay unit coupled to the data sampling unit and causing a relative delay between a phase of said received data signals and a phase of said clock signals, a decision use pulse generating unit which receives as input a transmitted frame timing pulse of a transmitted signal transmitted in advance from the master station for causing transmission of said transmitted signals from said slave stations and which generates a decision pulse after a predetermined time from the transmitted frame timing pulse, and a received frame timing pulse generating unit which receives as input the received data signals, detects the frame bit by the received data signals, and generates a received frame timing pulse, said relative delay unit receives as input the decision pulse and said received frame timing pulse, decides on the timing of appearance of the received frame timing pulse by the decision pulse, and causes a relative delay based on the timing of appearance between the received data signals and the clock.

3. An apparatus for reproducing received data as set forth in claim 2, wherein said data/clock relative delay unit is provided with at least a decision circuit which monitors the timing of appearance of the received frame timing pulse based on the first decision pulse from said decision pulse generating unit, decides whether to give a relative delay between the received data signals and the clock signals and on the rough amount of the delay when it is to be given, and performs coarse adjustment of the relative delay.

4. An apparatus for reproducing received data as set forth in claim 3, wherein said data/clock relative delay unit comprises a terminal equipment phase difference detector which monitors the received data signals each time a second decision pulse appears from said decision pulse generating unit, detects the phase difference between the two units of subscriber terminal equipment nearest to and farthest from the master station in accordance with the results of monitoring, and outputs a selection signal for fine adjustment of the relative delay.

5. An apparatus for reproducing received data as set forth in claim 3, wherein said first decision pulse input to the decision circuit is determined by the offset time until the signal transmitted from the master station is received at said slave station and retransmitted as said transmitted signal from said slave station and a maximum round trip time until it is transmitted from the master station and turns around at the slave station to return to the master station.

6. An apparatus for reproducing received data as set forth in claim 4, wherein the second decision pulse input to said terminal equipment phase difference detector is produced as a pulse which specifies a particular bit position where two transmitted signals from two slave stations collide with each other with opposite polarities.

7. An apparatus for reproducing received data as set forth in claim 6, wherein said terminal equipment phase difference detector controls the relative delay to be smaller or larger in accordance with the size of the pulse width of the received data signal obtained by combining the two transmitted signals at the particular bit position.

8. An apparatus for reproducing received data as set forth in claim 7, wherein said pair of received data signals (RD+, RD−), colliding at opposite polarities, are respectively the DC balancing bits ($L_{F_a}$) appearing directly after the auxiliary frame bit $F_a$ among the plurality of DC balancing bits.

9. An apparatus for reproducing received data as set forth in claim 6, wherein said decision pulse generating unit comprises:

a first counter which receives as input said clock signals and counts the total number of bits comprising one frame;

a first D-flipflop which initially loads the first counter by said transmitted frame timing pulse;

a first decoding means for outputting said first decision pulse when the count of the first counter reaches a value corresponding to the sum of the offset time and maximum round trip time; and a second decoding means for outputting a second decision pulse when the count of the first counter reaches a value corresponding to said particular bit position.

10. An apparatus for reproducing received data as set forth in claim 6, wherein said decision circuit comprises:

a second D-flipflop which outputs a simple signal of "0" when said received frame timing pulse falls in the pulse width of said first decision pulse;

a differentiating circuit which produces a rising pulse of said clock;

an S-R flipflop which is set by said received frame timing pulse, is reset by said rising pulse of said clock signal, and therefore outputs from said Q-output a pulse having a pulse width proportional to the distance between said master station and the nearest slave station; and a second counter which receives as input the clock signals, counts the total number of bits comprising one frame, and is changed in the timing of start of counting proportionally to the pulse width of said pulse from the Q-output of the S-R flipflop, a variety of amounts of delay being provided for fine adjustment of the relative delay from the output of the second counter.

11. An apparatus for reproducing received data as set forth in claim 10, wherein:

said terminal equipment phase difference detector is comprised so as to output a selection signal for selecting one of the variety of delay amounts from said second counter, said terminal equipment comprises a first timing detection counter which detects the timing of a front edge part of the pulse at said particular bit position, a second timing detection counter which detects the timing of a rear edge part of the pulse at said particular bit position, a first comparator which detects if said front edge part is after or before a predetermined reference time for judgment of the front edge part, and a second comparator which detects if said rear edge part is after or before a predetermined reference time for judgment of the rear edge part, and said terminal equipment generates said selection signal by the outputs of the first and second comparators.

* * * * *